(12) United States Patent
Wei et al.

(10) Patent No.: US 9,886,111 B2
(45) Date of Patent: Feb. 6, 2018

(54) WEARABLE ELECTRONIC APPARATUS AND ACQUISITION CONTROL METHOD

(71) Applicant: Lenovo (Beijing) Co., Ltd., Beijing (CN)

(72) Inventors: Weidong Wei, Beijing (CN); Junfeng Liu, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 62 days.

(21) Appl. No.: 14/583,436

(22) Filed: Dec. 26, 2014

(65) Prior Publication Data
US 2015/0253886 A1   Sep. 10, 2015

(30) Foreign Application Priority Data
Mar. 7, 2014   (CN) .......................... 2014 1 0083170

(51) Int. Cl.
*G06F 3/041*   (2006.01)
*G06T 3/40*    (2006.01)
(Continued)

(52) U.S. Cl.
CPC .............. *G06F 3/041* (2013.01); *G06F 1/163* (2013.01); *G06F 3/147* (2013.01); *G06T 3/40* (2013.01);
(Continued)

(58) Field of Classification Search
CPC ...... G06F 3/041; G06F 3/147; G09G 2380/08
See application file for complete search history.

(56) References Cited

U.S. PATENT DOCUMENTS

| 3,915,548 A * | 10/1975 | Opittek .................. G02B 27/01 345/7 |
| 8,725,842 B1 * | 5/2014 | Al-Nasser .............. G04G 17/08 367/11 |

(Continued)

FOREIGN PATENT DOCUMENTS

| CN | 102196072 A | 9/2011 |
| JP | 2000-112395 | 4/2000 |
| WO | WO 2014/035680 A2 | 3/2014 |

OTHER PUBLICATIONS

Office Action issued in corresponding German Patent Application No. 102014019631.3 dated Aug. 6, 2015, 15 pages (including translation).

(Continued)

*Primary Examiner* — Nelson Rosario
*Assistant Examiner* — Chun-Nan Lin
(74) *Attorney, Agent, or Firm* — Brinks Gilson & Lione; G. Peter Nichols

(57) ABSTRACT

An electronic apparatus and acquisition method includes a body device with a processing unit; a holding device connected with the body device for holding a relative position relationship with a user; a first display unit set on the body device or the holding device for outputting a first image; and an acquisition unit set on at least one of the body device and the holding device for acquiring a first signal, wherein the first display unit includes a first display component and a first optical component. The first display component is used to display the first image; the first optical component is used to receive a light corresponding to the first image sent from the first display component, and performs a optical path conversion on the light corresponding to the first image, so as to form an enlarged virtual image corresponding to the first image.

18 Claims, 23 Drawing Sheets

(51) Int. Cl.
*G09G 3/3208* (2016.01)
*G09G 3/36* (2006.01)
*G06F 3/147* (2006.01)
*G06F 1/16* (2006.01)
*G06F 3/01* (2006.01)

(52) U.S. Cl.
CPC ............ *G09G 3/3208* (2013.01); *G09G 3/36* (2013.01); *G06F 3/011* (2013.01); *G09G 2370/022* (2013.01); *G09G 2380/08* (2013.01)

(56) References Cited

U.S. PATENT DOCUMENTS

| | | | | |
|---|---|---|---|---|
| 2011/0221688 A1* | 9/2011 | Byun | ...................... | H04B 1/385 345/173 |
| 2012/0092383 A1 | 4/2012 | Hysek et al. | | |
| 2012/0203076 A1 | 8/2012 | Fatta et al. | | |
| 2013/0002538 A1* | 1/2013 | Mooring | ................ | G06F 3/017 345/156 |
| 2013/0033485 A1* | 2/2013 | Kollin | .................... | G06F 1/1637 345/419 |
| 2013/0293494 A1 | 11/2013 | Reshef | | |
| 2014/0062892 A1* | 3/2014 | Dickinson | ............. | G06F 3/0412 345/173 |
| 2014/0078694 A1 | 3/2014 | Wissmar | | |
| 2014/0118354 A1* | 5/2014 | Pais | ....................... | G09G 5/373 345/428 |
| 2014/0125620 A1* | 5/2014 | Panther | ................... | G06F 3/011 345/173 |
| 2015/0177825 A1* | 6/2015 | Reponen | ................ | G04G 9/007 345/156 |
| 2015/0186705 A1* | 7/2015 | Magi | .................... | G06K 9/0002 382/125 |
| 2015/0193102 A1* | 7/2015 | Lanier | .................... | G06F 3/017 715/746 |

OTHER PUBLICATIONS

Office Action, and English language translation thereof, in corresponding Chinese Application No. 201410083170.0, dated Jan. 5, 2017, 28 pages.

\* cited by examiner

WEARABLE ELECTRONIC APPARATUS AND ACQUISITION CONTROL METHOD

This application claims priority to Chinese patent application No. 201410083170.0 filed on Mar. 7, 2014 the entire contents of which are incorporated herein by reference.

The present disclosure is related to the field of electronic apparatus, and more particularly, to an electronic apparatus in which a display unit and an acquisition unit is built and an acquisition control method thereof.

BACKGROUND

At present, a wearable electronic apparatus, such as a smart watch, is usually provided with only a traditional display, such as a Liquid Crystal Display (LCD), an Organic Electroluminance Display, an Organic Light-Emitting Diode (OLED) display, and so on. The display area of the traditional display with which the wearable electronic apparatus, such as the smart watch, is provided is usually small, since it is limited to a size of the wearable electronic apparatus itself, and only limited information may be displayed.

Therefore, it is desired to provide an electronic apparatus in which a display unit and an acquisition unit is built and an acquisition control method thereof being capable of providing an image or video display with larger size and higher resolution without the limitation of the size of the wearable electronic apparatus itself, such as the smart watch.

SUMMARY

It is provided an electronic apparatus comprising a body device comprising a processing unit for generating an image to be displayed and performing a display control and an acquisition control; a holding device connected with the body device, comprising at least a holding state in which the holding device is able to be at least one part of one annular space or at least one part of an approximated annular space compliant with a first predetermined condition, the annular or the approximated annular space is able to enclose the periphery of a cylinder compliant with a second predetermined condition; a first display unit set on the body device or the holding device for outputting a first image; and an acquisition unit set on at least one of the body device and the holding device for acquiring a first signal, wherein the first display unit comprises a first display component and a first optical component, the first display component is used to display the first image; the first optical component is used to receive a light corresponding to the first image sent from the first display component, and performs a optical path conversion on the light corresponding to the first image, so as to form an enlarged virtual image corresponding to the first image.

In addition, it is also provided an acquisition control method applied to an electronic apparatus comprising a body device comprising a processing unit for generating an image to be displayed and performing a display control and an acquisition control; a holding device connected with the body device, comprising at least a holding state in which the holding device is able to be at least one part of one annular space or at least one part of an approximated annular space compliant with a first predetermined condition, the annular or the approximated annular space is able to enclose the periphery of a cylinder compliant with a second predetermined condition; a first display unit set on the body device or the holding device for outputting a first image; and an acquisition unit set on at least one of the body device and the holding device for acquiring a first signal, wherein the first display unit comprises a first display component and a first optical component, the first display component is used to display the first image; the first optical component is used to receive a light corresponding to the first image sent from the first display component, and performs an optical path conversion on the light corresponding to the first image, so as to form an enlarged virtual image corresponding to the first image, and the acquisition method comprises the steps of acquiring a first signal; and performing a first operation according to the first signal.

The electronic apparatus and the acquisition control method in accordance with the embodiments of the disclosure utilize an enlarged virtual image display comprising the display component and the optical system to achieve an image or video display providing larger size and higher resolution without any limitation of the size of the wearable electronic apparatus itself, such as the smart watch, meanwhile, they utilize a signal acquisition operation comprising various acquisition units to achieve various operations and controls suitable for the wearable electronic apparatus, such that a best user experience is provided for a wide variety of different usages for the electronic apparatus. Furthermore, the electronic apparatus exhibits low energy consumption, and is not limited to the use conditions, providing good privacy for use at the same time, as compared with the micro projector for displaying larger image and video as well.

Other features and effects of the disclosure will be set forth in the following specification, and apparent partially from the specification or understood by embodying the disclosure. The objects and other effects of the disclosure can be implemented and achieved by the structures presented particularly in the specification, the claims, and the drawings.

BRIEF DESCRIPTION OF THE DRAWINGS

The drawings are provided for a further appreciation of the disclosure and become a part of the specification, which are used to explain the disclosure in conjunction with the embodiments thereof, and constructed by no means any limitation of the disclosure.

DETAILED DESCRIPTION

Figure 1A:
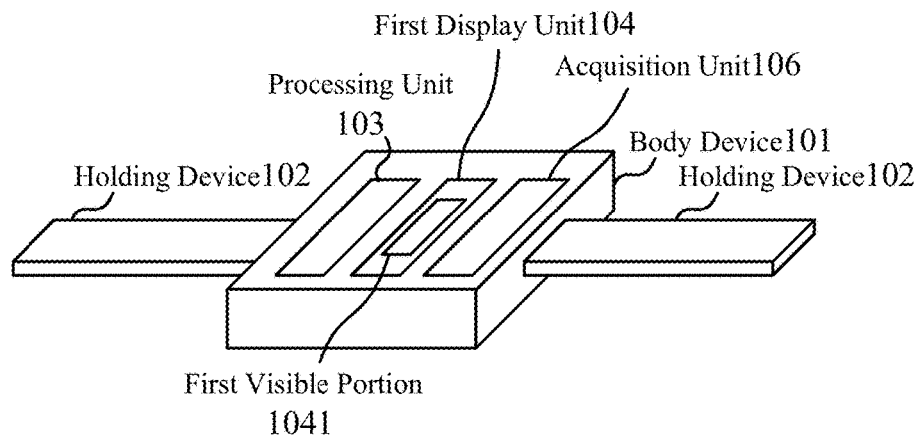
FIGS. 1A to 1C are structural block diagrams illustrating the electronic apparatus in accordance with an embodiment of the disclosure.

Various embodiments in accordance with the disclosure will be depicted in detail with reference to the drawings. It is noted herein that the like reference numerals are assigned to the constitution parts with the like or similar structures and functions in the drawings, and the description thereof will be omitted.

Embodiments of the disclosure will be depicted with reference to the drawings hereinafter.

The electronic apparatus in accordance with the embodiment of the disclosure may comprise a body device, a holding device, a first display unit, and an acquisition unit.

Figure 1B:
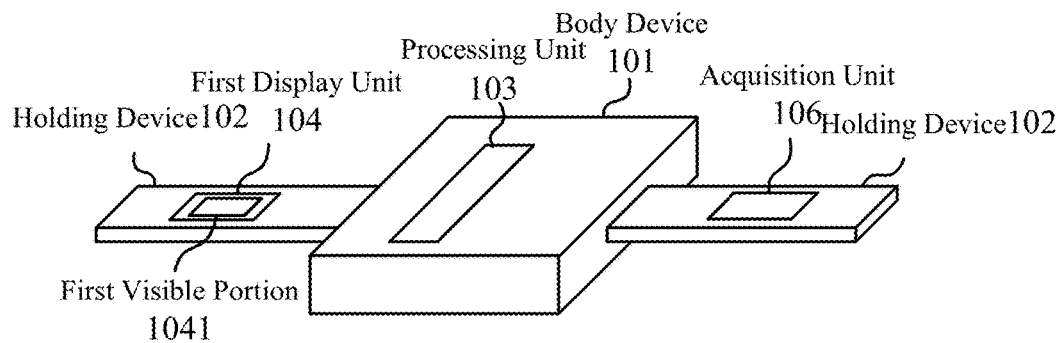
Figure 1C:
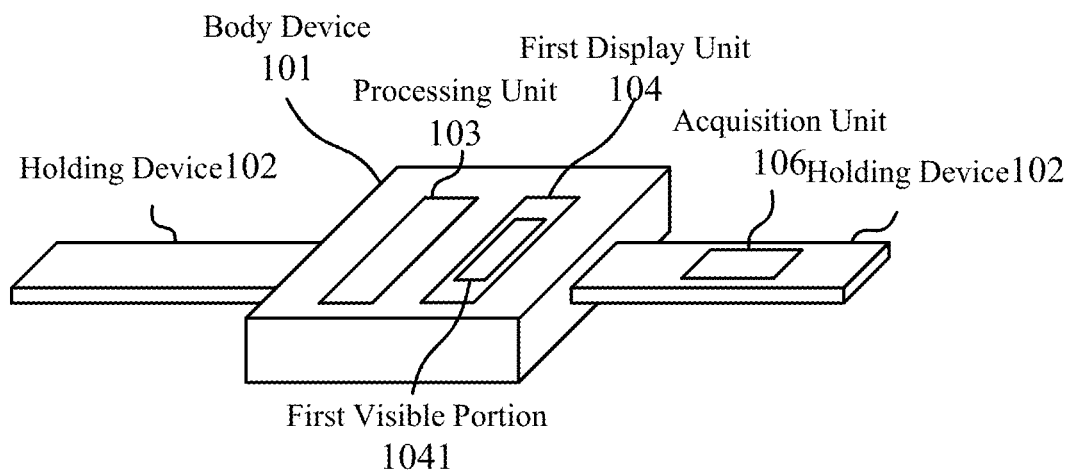

Firstly, the electronic apparatus in accordance with the embodiment of the disclosure will be depicted in detail with reference to FIGS. 1A to 1C. The electronic apparatus in accordance with the embodiment of the disclosure may be a wearable electronic apparatus, such as a smart watch. It is of course appreciated readily by the skilled in the art that the electronic apparatus in accordance with the embodiment of the disclosure is not limited thereto, and may comprise any electronic apparatus with a display unit (which also can be referred to as a display) therein. For a purpose of convenience of description, the wearable electronic apparatus, such as the smart watch, will be exemplified for the depiction hereinafter.

FIGS. 1A to 1C are structural block diagrams illustrating the electronic apparatus in accordance with the embodiment of the disclosure. The electronic apparatus 100 in accordance with the embodiment of the disclosure comprises a body device (which also can be referred to as body or main body) 101 and a holding device 102, as shown in FIGS. 1A to 1C. The holding device 102 is connected with the body device 101, and the holding device 101 is used to fix a relative position relationship with respect to a user of the electronic apparatus, among others. The holding device 102 comprises at least one holding state in which the holding device 102 can be one annular space or at least part of an approximated annular space compliant with a first predetermined condition, and the annular or the approximated annular space can enclose a periphery of a cylinder compliant with a second predetermined condition.

The first to fourth example configurations of the holding device will be depicted with further reference to FIGS. 2A to 2D hereinafter. In FIGS. 2A to 2D, for a simplicity and clearance of description, only the body device 101 and the holding device 102 in the electronic apparatus 100 are shown.

Figure 2A:
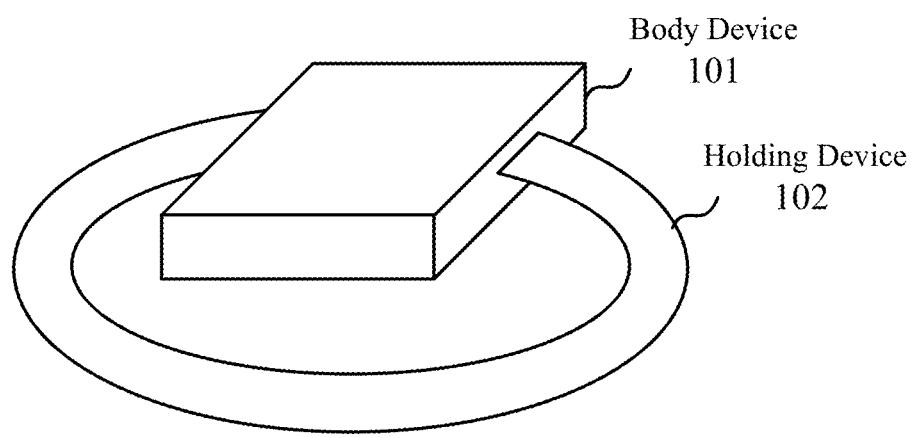
FIGS. 2A to 2D are block diagrams illustrating the first to fourth configuration examples of a holding device in the electronic apparatus in accordance with the embodiment of the disclosure.
Figure 2B:
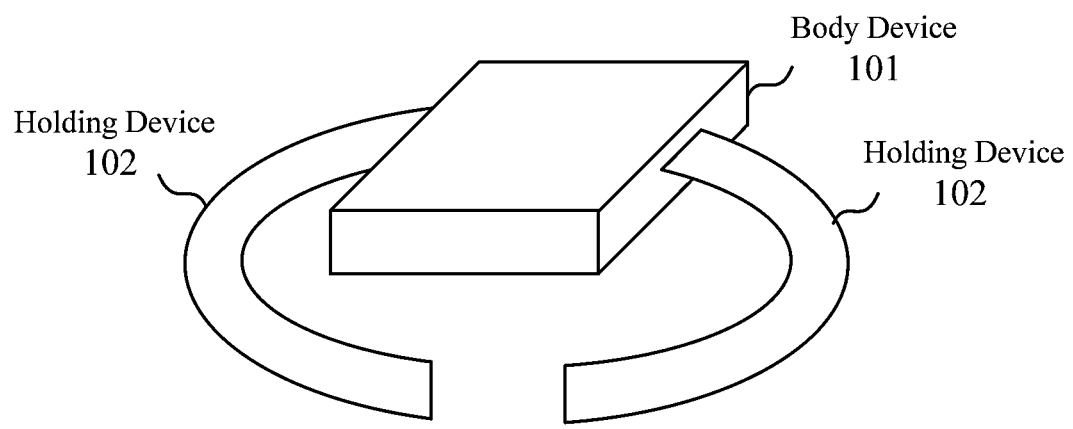

Particularly, FIGS. 2A and 2B illustrate two holding states in which the holding apparatus 102 is connected with the body device 101, respectively. A closed-loop annular space is formed by the holding device 102 and the body device 101 in a first holding state as shown in FIG. 2A, and wherein parts of the annular space are constructed by the holding device 102 and the body device 101 respectively. An approximated annular space with a small opening is formed by the holding device 102 and the body device 101 in a second holding state as shown in FIG. 2B, and wherein parts of the annular space are constructed by the holding device 102 and the body device 101 respectively. In one embodiment of the disclosure, the body device 101 is a dial portion of the smart watch, and the holding device 102 is a strap portion of the smart watch. The annular or the approximated annular space formed by the body device 101 and the holding device 102 can enclose a periphery of a wrist of a user which is the cylinder, and a diameter of the annular or the approximated annular space is greater than that of the wrist of the user and less than that of the fists thereof.

Figure 2C:
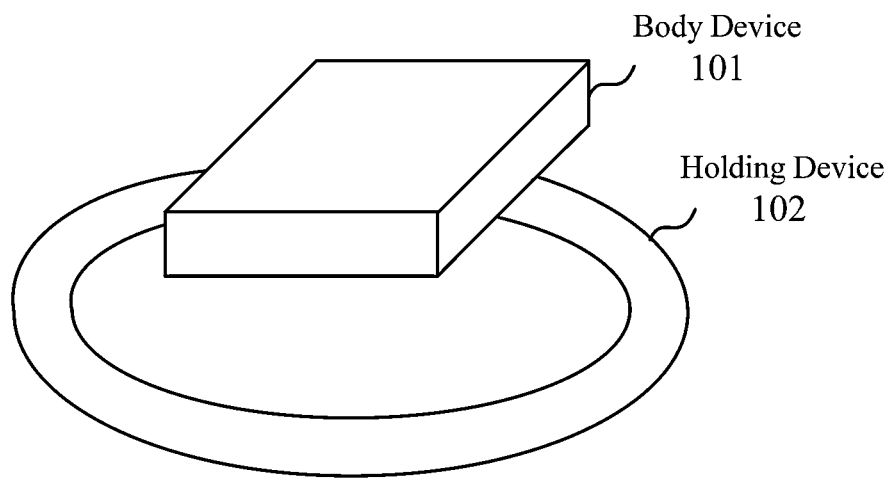
Figure 2D:
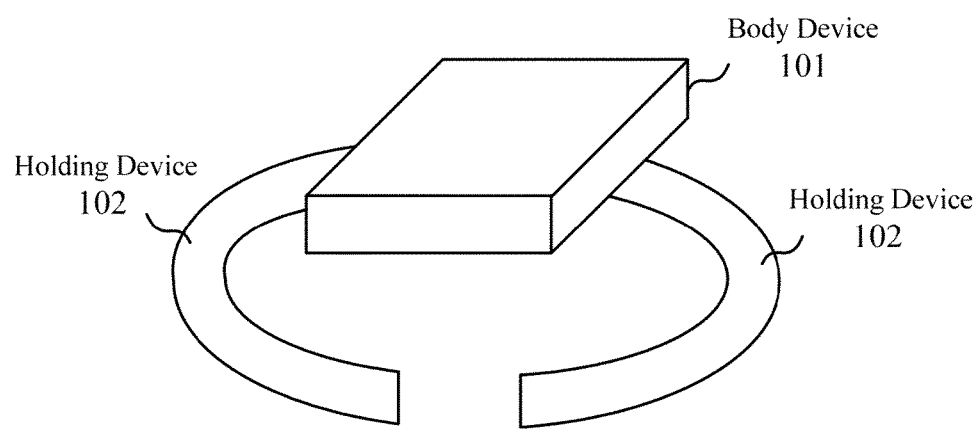

Moreover, the annular or the approximated annular space may surely be formed by the holding device 102 individually. The body device 101 may be arranged on the holding device 102, i.e., the body device 101 is attached to the holding device 102 in a surface contact manner, such that the annular space (FIG. 2C) or the approximated annular space (FIG. 2D) for enclosing the cylinder is merely formed by the holding device 102 itself, as shown in FIGS. 2C and 2D. The holding device 102 is provided with a holding mechanism (not shown), such as an agrafe, a snap, a zip, and the like.

Returning to FIGS. 1A to 1C, the configuration of the electronic apparatus 100 is further depicted.

More particularly, a processing unit 103 and a first display unit 104 are arranged on the body device 101, as shown in FIGS. 1A to 1C. The processing unit 103 is utilized to generate an image to be displayed and perform a display control. The first display unit 104 is utilized to output a first image. More particularly, the first image generated by the processing unit 103 is output by the first display unit 104 under the display control performed by the processing unit 103. The first display unit 104 is arranged on the body device 101 in the electronic apparatus 100 shown in FIGS. 1A and 1C. However, it is appreciated readily by those skilled in the art that the disclosure is not limited thereto. For example, the first display unit 104 may also be arranged on the holding device 102 in the electronic apparatus 100 shown in FIG. 1B.

The first display unit 104 is a display unit complying with various display principles. For example, the first display unit 104 may be a near-to-eye optical (e.g., LOE (Light-guide Optical Element)) display system.

More particularly, the first display unit 104 may comprise a first visible portion 1041 which is a portion viewed by the user so as to perceive or see a displayed content in the first display unit 104. That is, the first display unit 104 as described below contains a plurality of members depending on the principle thereof, and wherein a first visible portion 1041 is a region in which a display of the image content is observed actually by the user. At this point, a position of the first display unit 104 as described above may in fact refer to the position of the first visible portion 1041.

The principle and implementation of the first display unit 104 will be described particularly with reference to FIGS. 3A to 3D and FIGS. 4A to 4C hereinafter.

Figure 3A:
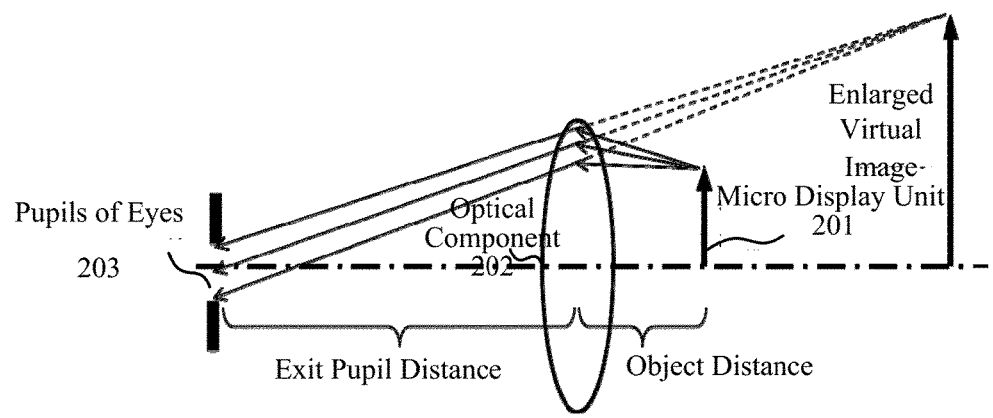
FIGS. 3A to 3D are principle diagrams and implementations illustrating a near-to-eye optical display system employed in the electronic apparatus in accordance with the embodiment of the disclosure.

FIG. 3A is the principle diagram illustrating the near-to-eye optical display system employed in the electronic apparatus in accordance with the embodiment of the disclosure. The near-to-eye optical display system is employed to be the first display unit 104 in the electronic apparatus in accordance with the embodiment of the disclosure. The light emitted by a micro display unit 201 in the near-to-eye optical display system corresponding to the image displayed thereby is received via an optical component 202, such as a group of lenses, and subjected to an optical path conversion accordingly, as shown in FIG. 3A. As a result, the light after the optical path conversion enters into the pupils 203 of the viewer and forms an enlarged virtual image.

Figure 3B:
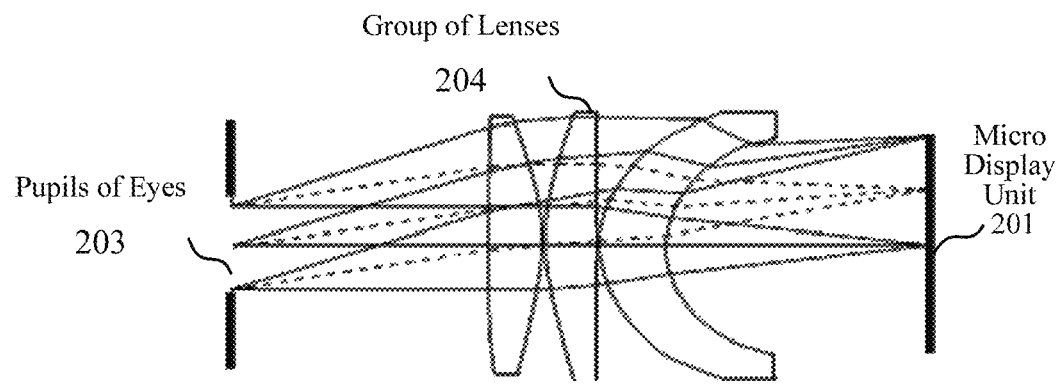
Figure 3C:
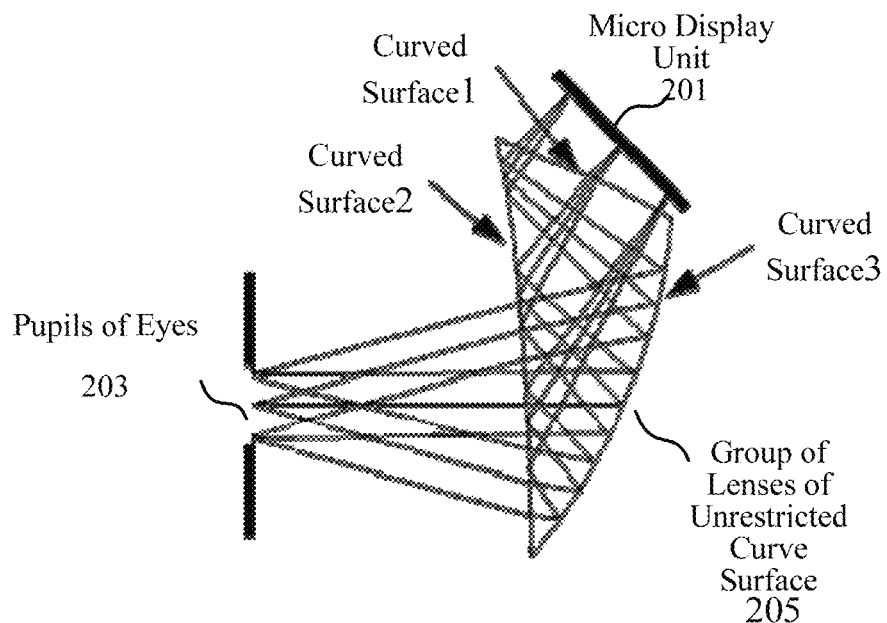
Figure 3D:
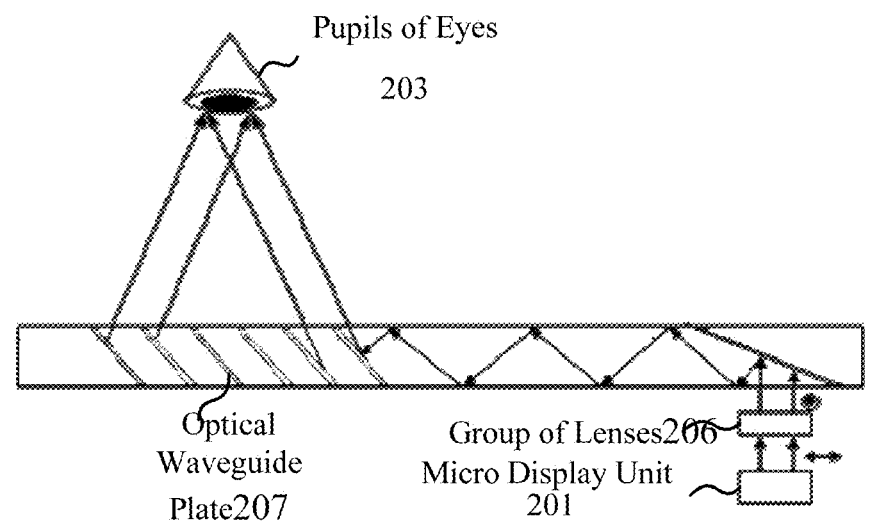

FIGS. 3B to 3D further illustrate three particular implementations based on the principle diagram of FIG. 2A. Particularly, a design of refractive-diffractive hybrid curved surface is employed in the solution illustrated in FIG. 3B, wherein a group of lenses 204 corresponds to the optical component 202 as shown in FIG. 3A, such that the volumes required for the lenses are reduced. The solution as shown in FIG. 3C employs a design of free form curved surface in which a group of free form curved surface lenses 205 comprising the curved surfaces 1, 2, and 3 corresponds to the optical component 202 as shown in FIG. 3A, such that the volumes required for the lenses are further reduced. The solution illustrated in FIG. 3D employs a design of parallel panel in which an optical waveguide plate 207 is included in addition to the group of lenses 206 corresponding to the optical component 202 as shown in FIG. 3A. In a case where a required thickness of the lens is reduced, a control, such as a translation, for an exit direction of the light for forming an enlarged virtual image, i.e., a display direction of the enlarged virtual image, is conducted by utilizing the optical waveguide plate 207. It is understood readily by those skilled in the art that the near-to-eye optical display system employed in the electronic apparatus in accordance with the embodiment of the disclosure is not limited to those as shown in FIGS. 3B to 3D above, and other implementations, such as a design of projection eye lens, may also be employed.

Figure 4A:
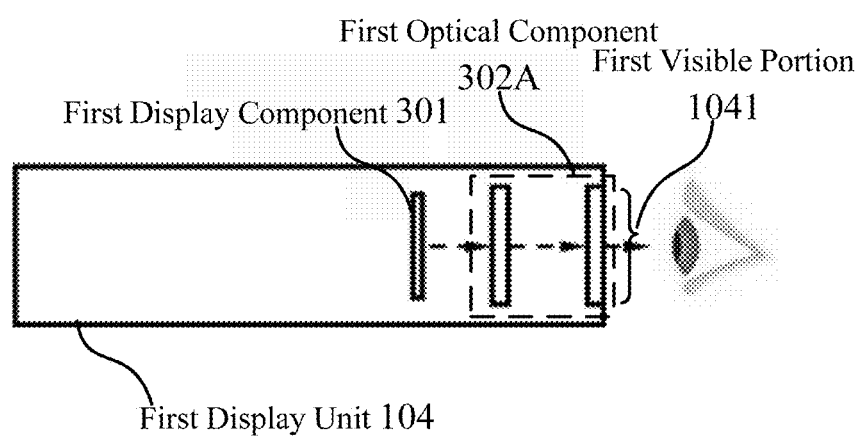
FIGS. 4A to 4C are schematic diagrams illustrating a display unit in the electronic apparatus in accordance with the embodiment of the disclosure.
Figure 4B:
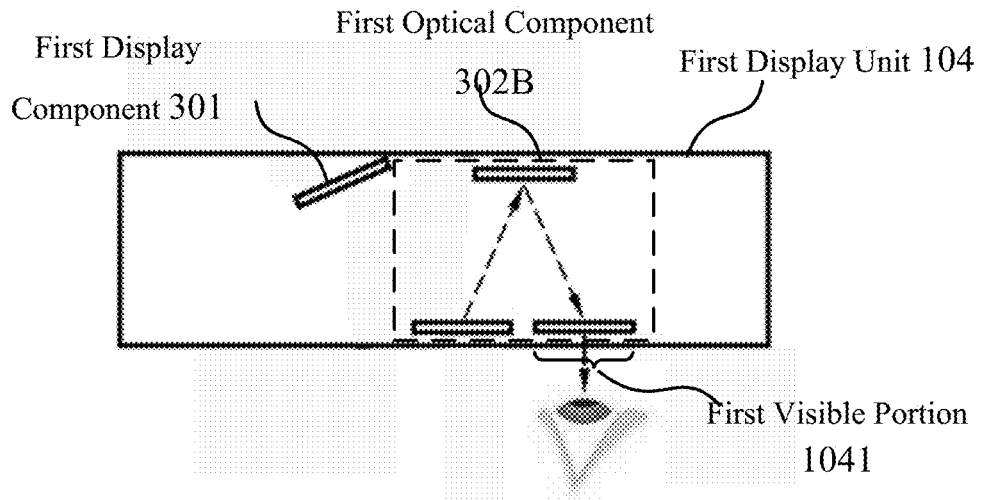
Figure 4C:
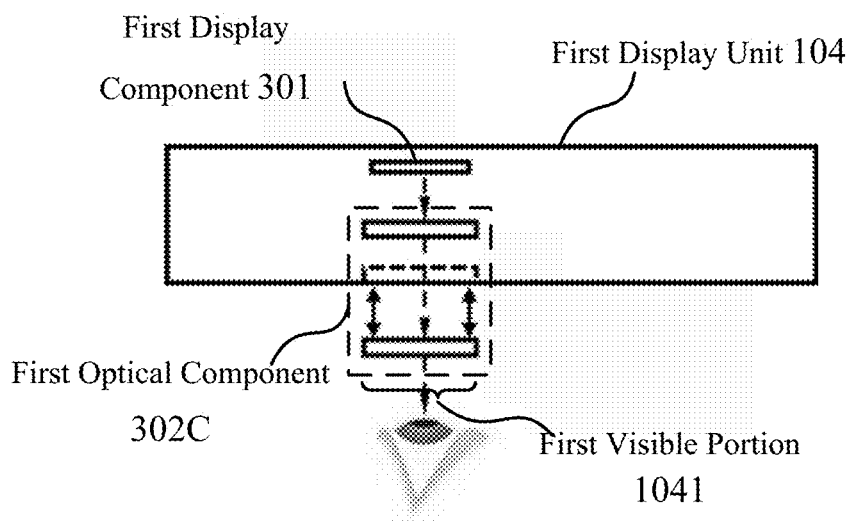

FIGS. 4A to 4C are schematic diagrams illustrating the display unit in the electronic apparatus in accordance with the embodiment of the disclosure. The near-to-eye optical display system described with reference to FIG. 3 is employed by the first display unit 104 in the electronic apparatus 100 in accordance with the embodiment of the disclosure. The first display unit 104 comprises a first display component 301 for displaying a first image and a first optical component 302 (a first optical components 302A to 302C in FIGS. 4A to 4C) for receiving the light corresponding to the first image emitted by the first display component 301, and for performing the optical path conversion on the light corresponding to the first image, in order to form the enlarged virtual image corresponding to the first image.

Particularly, in FIG. 4A, the first display component 301 may be a micro display, and the first optical component 302A is formed by a group of lenses. The enlarged virtual image corresponding to the first image displayed by the first display component 301 is formed by such group of lenses.

In FIG. 4B, the first display component 301 may also be a micro display, and the first optical component 302B is formed by an optical device conducting multiple reflections in the apparatus. In that case, a size of a space required for the first display unit 104 may be saved, as compared with the first optical component 302A as shown in FIG. 3A, such that it is convenient for a design and manufacture of a more miniature electronic apparatus.

In FIG. 4C, the first display component 301 may also be a micro display as well, and the first optical component 302C is formed by a group of zooming lenses performing in-and-out zooming under a drive by a drive unit (not shown) within the apparatus. In that case, the size of the enlarged virtual image displayed by the first display unit 104 may be adjusted dynamically by zooming, as compared with the first optical component 302A, such that different requirements of the users are satisfied.

The region in which the display of the image content by the first display unit 104 is observed actually by the user is the first visible portion 1041 as described above with reference to FIGS. 1A to 1C, as shown in FIGS. 4A to 4C.

In the electronic apparatus 100 as described above with reference to FIGS. 4A to 4C, at least part of the first optical component 302 is a component in which a transmittance rate is compliant with a predetermined condition in an outward direction of the annular or the approximated annular space. At least part of the first optical component 302 is a region corresponding to a displayed image upon a display is performed. More generally, in the outward direction of the annular or the approximated annular space corresponding to the at least part of the first optical component 302, and the transmittance rate of the electronic apparatus 100 is compliant with the predetermined condition. Particularly, the electronic apparatus 100 corresponds to a portion of the optical waveguide plate 207 in the display direction in which the at least part of the first optical component 302 is the enlarged virtual image, as shown in FIG. 3D. The transmittance rate of a portion of the optical waveguide plate 207 observed directly by the eyes of the user is compliant with the predetermined condition, and the transmittance rate of a portion not observed directly by the eyes of the user, for example, the portion corresponding to the micro display unit 201 and the group of lenses 206 is not necessarily compliant with the predetermined condition. The predetermined condition may be that the transmittance rate is greater than or equal to a predetermined value. For example, the predetermined value may be 30%. The predetermined value may be 70%. As such, a skin of the user himself/herself may be observed through the electronic apparatus 100 by the user.

Returning to FIGS. 1A to 1C, the configuration of the electronic apparatus 100 is further depicted.

More particularly, an acquisition unit 106 is also arranged on the body device 101, as shown in FIGS. 1A to 1C. The processing unit 103 is utilized to perform an acquisition control. The acquisition unit 106 is utilized to acquire a first signal. More particularly, the first signal is acquired by the acquisition unit 106 under the acquisition control performed by the processing unit 103. The acquisition unit 106 is arranged on the body device 101 in the electronic apparatus 100 shown in FIG. 1A. However, it is appreciated readily by those skilled in the art that the disclosure is not limited thereto. For example, the acquisition unit 106 may also be arranged on the holding device 102 in the electronic apparatus 100 shown in FIGS. 1B and 1C.

The acquisition unit 106 is a unit working compliant with various acquisition principles. For example, the acquisition unit 106 may comprise, but not limited to, a sensing unit, an image capture unit, a sound capture unit, a biometric capture unit, and/or a distance detection unit, etc., for acquiring the same or different type(s) of the first signal(s), such that the same or different operation(s) is/are performed by the electronic apparatus according to the first signal(s).

One or more acquisition units 106 may be set in the electronic apparatus 100, and the acquisition units 106 may be set at respective positions on the electronic apparatus 100.

More particularly, it is apparent that a plurality of acquisition units 106 may be set on the body device 101 and/or the holding device 102 respectively, when those acquisition units 106 are included in the electronic apparatus 100.

However, a plurality of individual function modules may also be set on the body device 101 and/or the holding device 102 respectively, since the acquisition unit 106 possibly consists of those function modules, when only one acquisition unit 106 is included in the electronic apparatus 100, that is, such single acquisition unit 106 may also be set on the body device 101 and/or the holding device 102. For example, the acquisition unit 106 may be set on the body device 101 or the holding device 102, if the image capture unit is construed narrowly to comprise merely the group of lenses, when the acquisition unit 106 is the image capture unit, such as a video camera. Conversely, if the image capture unit is construed generally to comprise only the function modules of a group of lenses, an internal imaging unit, and a shutter button, etc., apparently, those different function modules may be set on the body device 101 and/or the holding device 102 respectively.

The principle and implementation of the acquisition unit 106 will be depicted specifically in various embodiments hereinafter.

First Embodiment

In the first embodiment of the disclosure, the acquisition unit 106 may comprise a sensing unit (which also can be referred to as sensor) for sensing a sense control operation generated by an event that an operating object touches or near touches a sense region, in order to generate a first sensing signal. The processing unit 103 generates a first control signal according to the first sensing signal, and controls the electronic apparatus 100 to perform the first control signal.

For example, the sensing unit 106 may be a type of contact sensing unit which is an input device for controlling the electronic apparatus 100 through a physical contact (a touch operation) above the contact sense region, e.g., a smooth surface of an operation panel, by an operating object, e.g., a finger, a stylus, and so on. For example, the touch sensing unit may be a contact touch panel, and the like. Alternatively, the touch sensing unit may be a contact touch screen, and the like, when integrated with a display unit together.

Alternatively, the sensing unit 106 may also be a type of suspension sensing unit which is an input device for controlling the electronic apparatus 100 through a non-physical contact (a suspension operation) by a distance, e.g., 2 centimeter (cm), from the top of the contact sense region, e.g., a smooth surface of an operation panel, by an operating object, e.g., a finger, a stylus, and so on. For example, the touch sensing unit may be a contact touch panel, and the like. Alternatively, the touch sensing unit may be a non-contact touch screen, and the like, when integrated with a display unit together.

The processing unit 103 may control the electronic apparatus to operate in response to the sense control issued by the user through a mapping relationship by querying a mapping table, a mapping file, a database, and the like, after the sensing unit 106 operates according to a sense control issued by the user. For example, when the sensing unit 106 senses that the user performs a single click operation (in the case of the contact sense) or a finger press operation (in the case of the non-contact sense) on an operation panel, the processing unit 103 may control the electronic apparatus 100 to complete various processes corresponding thereto according to the interactive control operations as described above by the user.

A relative position relationship between the sensing unit 106 and the first display unit 104 and/or other units in the electronic apparatus 100 may be configured optimally, in order to ensure that the user is able to input the interactive control operation to the electronic apparatus 100 more conveniently and flexibly by using that sensing unit 106 while viewing a response to such interactive control operation of the electronic apparatus 100 by using the first display unit 104.

For example, a convenient interactive control over the smart watch may be conducted by a touch control unit above a touch screen, when the sensing unit 106 and the first display unit 104, e.g., a common liquid crystal screen or an Organic Light-Emitting Diode (OLED) screen, are integrated with each other to form the touch screen and are arranged on the dial portion of the smart watch.

A touch unit set on the dial portion of the smart watch may be utilized to conduct the interactive control, when the first display unit 104 is a near-to-eye display. A common display unit may be turned off, particularly, a touch screen may be used as an absolute or relative position control apparatus, when the interactive control is conducted, if the touch unit pertains to the touch screen comprising the common display unit.

The first display unit 104 comprises a first visible portion 1041 which is a portion viewed by the user so as to perceive or see a displayed content thereof in the first display unit, and located at a first region, as described above. The sensing unit 106 comprises a sense region above which the sense control operation generated by the operating object is sensed by the sensing unit 106.

Particularly, in the former case, the first region and the sense region may be the adjacent regions between which there is at least one common side. That is, the relative position relationship between a display surface, i.e., the first region where the first visible portion 1041 is located, of the first display unit 104, for example, which may be one near-to-eye display, and the sense region, e.g., a touch surface, of the sensing unit 106, e.g., the touch screen, is adjacent. More particularly, the former case may also include two different situations as follows.

In the first situation, the first display unit 104 and the sensing unit 106 are set concurrently on the holding device 102, e.g., the strap portion of the smart watch, or the first display unit 104 and the sensing unit 106 are set concurrently on the body device 101, e.g., the dial portion of the smart watch, and the first region and the sense region are on the same plane, as well as the sense region is set on at least part in a region surrounding around the first region. That is, on the same plane, the periphery of the first visible portion 1041, e.g., the display surface of the near-to-eye display, may be enclosed entirely or partially by the sense region, e.g., the touch surface.

The different configuration examples of the first display unit and the sensing unit in the first situation will be depicted with reference to FIGS. 5A and 5B hereinafter.

Figure 5A:
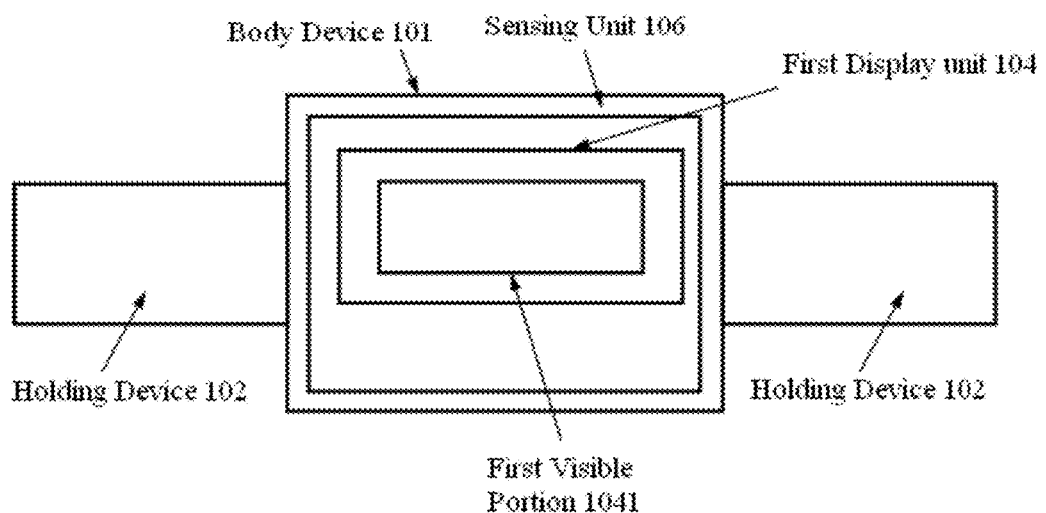
FIG. 5A is a top view illustrating a first configuration example of a sensing unit of the electronic apparatus in accordance with a first embodiment of the disclosure.

FIG. 5A is the top view illustrating a first configuration example of the sensing unit of the electronic apparatus in accordance with the first embodiment of the disclosure.

In the first configuration example, the first visible portion 1041 and the sense region are on an external surface of the annular or the approximated annular space concurrently, and the display direction of the first visible portion 1041 is in the outward direction of the annular or the approximated annular space, as well as the first visible portion 1041 is nested inside at least part of a strip region formed by the sense region.

For example, the display surface of the near-to-eye display and the touch surface of the touch screen are both on a frontal region of the dial portion, i.e., a top surface of the dial portion, of the smart watch, and a frame of the display surface is formed by the touch surface, so as to enclose the periphery of the display surface entirely, as shown in FIG. 5A. However, it is appreciated readily by those skilled in the art that the disclosure is not limited thereto. For example, the display surface and the touch surface may also be both on the strap portion of the smart watch. Further, a portion in the frame of the display surface may also be formed by the touch surface, so as to partially enclose the periphery of the display surface.

It is stated herein that the term "frame" may means an entity skeleton. That is, a dial skeleton of the smart watch is formed directly from a material, e.g., a glass and a metal, etc., constituting the sensing unit. Alternatively, the term "frame" may also means that the sensing unit is formed by an entity skeleton attached to the electronic apparatus. That is, in the case where the dial skeleton of the smart watch is formed from a plastic, the sensing unit may be fixed on the plastic skeleton through a manner of gluing, clipping, riveting, and so on.

As such, setting a touch sensor on the periphery of the display region of the smart watch, thereby the problem in which a displayed output will be impacted when input of touching is performed for the smart watch is solved. The touch sensor may be particularly set at the rim of the front surface of the smart watch (the displayed content of one display unit may at least be viewed in the front surface of the smart watch), as described above. That is, the touch sensor may be set at the dial frame of the smart watch.

More particularly, the touch sensor may be set on one or more sides around the smart watch. If the front surface of the smart watch is a rectangle, the touch region may be one or more sides, or even cover the entire rectangle. If the face of the smart watch is a circle, the touch region may be a section of arc, or even cover the entire circle. Apparently, such periphery-enclosed touch operation is comparatively convenient and fast, which avoids the problem in which it is prone to cause a misoperation upon inputting by touching due to a small volume of the electronic apparatus itself. In addition, an impact on the displayed output resulting from the touch input, which is particularly conspicuous in the case where the near-to-eye display unit viewed with a near-to-eye viewing by the user is required, may be avoided, since the touch region does not overlap with the display region.

Figure 6A:
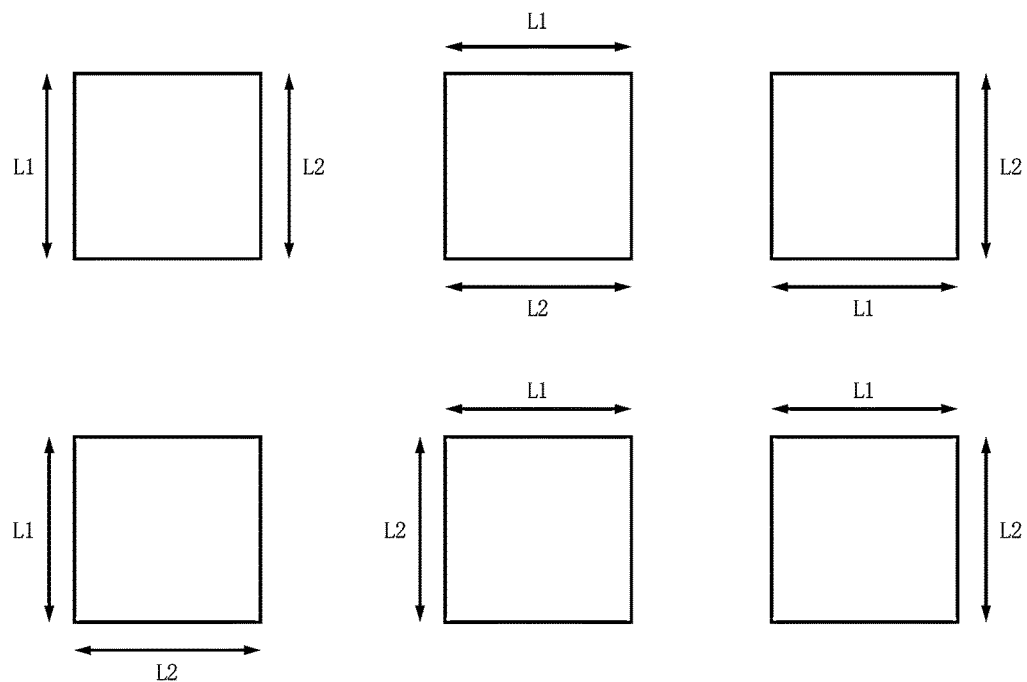
FIG. 6A is a first implementation illustrating a sensing region of the sensing unit of the electronic apparatus in accordance with the embodiment of the disclosure.

FIG. 6A is the first implementation illustrating the sense region of the sensing unit of the electronic apparatus in accordance with the embodiment of the disclosure.

In the first implementation, it is assumed that the front surface of the smart watch is a rectangle, and the touch region may be two sides of L1 and L2, then a specific distribution of the two sides of L1 and L2 has at least six possibilities with respect to the front surface of the rectangle electronic apparatus as shown in FIG. 6A.

Figure 6B:
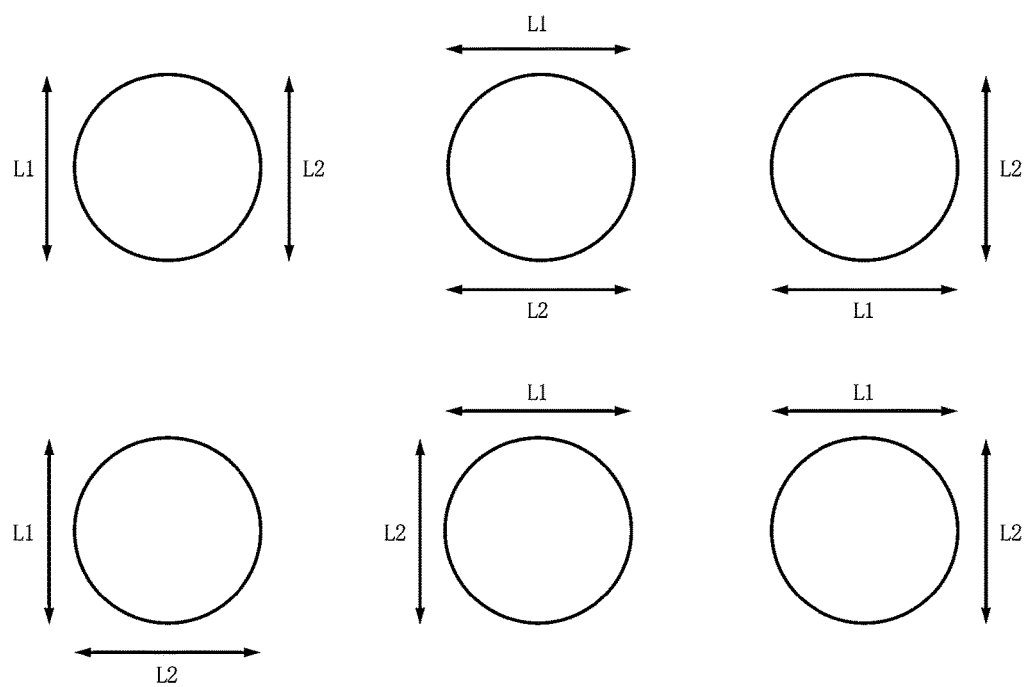
FIG. 6B is a second implementation illustrating the sensing region of the sensing unit of the electronic apparatus in accordance with the embodiment of the disclosure.

FIG. 6B is the second implementation illustrating the sense region of the sensing unit of the electronic apparatus in accordance with the embodiment of the disclosure.

In the second implementation, it is assumed that the front surface of the smart watch is a circle, and the touch region may be two sections of arcs of L1 and L2, then a specific distribution of the two sections of arcs of L1 and L2 has at least six possibilities with respect to the front surface of the circle electronic apparatus as shown in FIG. 6B.

In both of the above embodiments, for example, the substantial touch actions with respect to the two ends of L1 and L2 of the frame may be defined as a slide, a single click, a double click, a triple click, a long press, and a non-operation, etc.

20 combinations of operations, i.e., corresponding to 20 operation commands P11, P21-P22, P31-P33, P41-P44, P51-P55, and P61-P65 on which the certain execution may be defined by the user himself/herself, may be permuted and combined through the concurrent touch operations on two operation lines of L1 and L2, without any distinction of L1 and L2 from each other, as shown in Table 1 below.

Several possibilities for the specific distribution of L1 and L2 is shown in Table 1:

| L1/L2 | Slide | Single Click | Double Click | Triple Click | Long Press | Non-operation |
|---|---|---|---|---|---|---|
| Slide | P11 | | | | | |
| Single Click | P21 | P22 | | | | |
| Double Click | P3 | P32 | P33 | | | |
| Triple Click | P41 | P42 | P43 | P44 | | |

-continued

| L1/L2 | Slide | Single Click | Double Click | Triple Click | Long Press | Non-operation |
|---|---|---|---|---|---|---|
| Long Press | P51 | P52 | P53 | P54 | P55 | |
| Non-operation | P61 | P62 | P63 | P64 | P65 | |

However, it is appreciated readily by those skilled in the art that the disclosure is not limited thereto. 36 combinations of operations may be permuted and combined through the concurrent touch operations on two operation lines of L1 and L2, with a distinction of L1 and L2 from each other.

Among those 36 combinations of operations, only several optimal touch operations therein may be chosen in order to avoid the misoperation caused by the user and make the touch operation of the user to be the most natural and smooth. For example, those optimal touch operations may be the concurrent sliding in the same or different directions for L1 and L2. For the circle watch, the touch operation as described above is to slide continuously along the arc; for the rectangle watch, the touch operation as described above is to slide along the segments of the sides of the rectangle. Moreover, a touch operation may be the operation by which L2 is sliding while L1 is long-pressed.

In the case of the rectangle dial, the operation as described above may be used for a zoom in-and-out, a page up-and-down, and a deletion of the content items, and/or an unlock of the entire screen.

In the case of the circle dial, the operation as described above may be used for a launch of program, a setup of location, an unlock of screen, a setup of time, a focusing of camera, an adjustment of volume, and the like. The detailed specification below may be referred for a purpose of a convenient appreciation.

For example, it is common that two fingers should press at the circle frame of the watch at 180 degrees upon a compass is used according to a habit of the user, if a program of the compass is installed in the smart watch. Therefore, the touch screen may be caused to detect the touch position and the touch region by the user continuously or at some interval, and it may be decided that the program of the compass is required to be opened by the user when the user has been determined to press at the fame of the watch with two fingers at 180 degrees, then the program of the compass is started automatically and immediately for the use of the user.

Again, for example, the digits for the time may be increased or decreased through a uni-direction sliding by using one finger in the circle frame by the user according to the habit of the user, if a program of an alarm clock is installed in the smart watch.

Again, for example, two fingers may be pressed at the frame of the watch by the user at some angle concurrently, and a clockwise or counter-clockwise rotation is conducted, so as to control the camera to zoom, similar to a gesture for the focusing of a common camera with lenses used by the user, if a program of a camera is installed in the smart watch. This will provide the user with an operation experience compliant most with the practice use habit, particularly the zooming control at the time when the user is viewing through the display unit while taking photos.

Again, for example, the circle frame of the smart watch may be used as a knob for controlling a volume up-or-down by the user, if a program of a music play is installed in the smart watch.

Figure 5B:
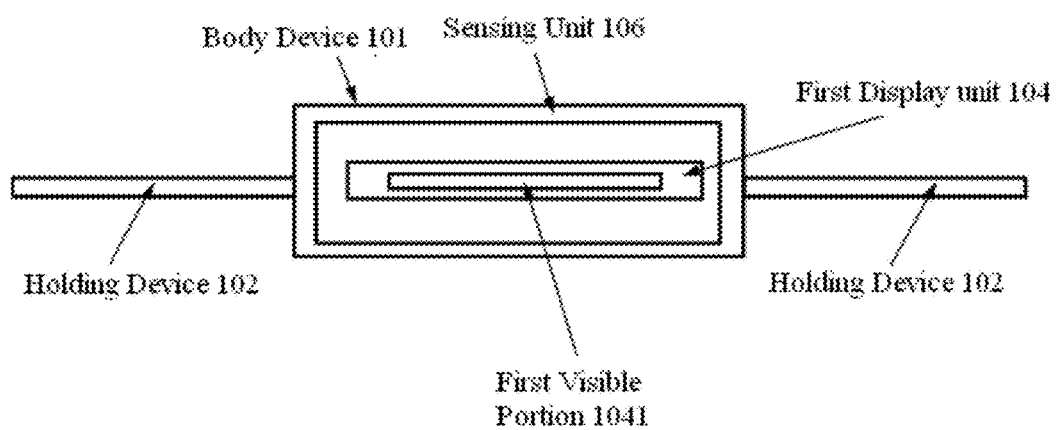
FIG. 5B is a side view illustrating a second configuration example of the sensing unit of the electronic apparatus in accordance with the first embodiment of the disclosure.

FIG. 5B is the side view illustrating the second configuration example of the sensing unit of the electronic apparatus in accordance with the first embodiment of the disclosure.

Similar to the first configuration example, in the second configuration example, the first visible portion 1041 and the sense region are on the same lateral surface with a first angle with respect to the external surface of the annular or the approximated annular space concurrently, and the display direction of the first visible portion 1041 is in a direction with the first angle with respect to the outward direction of the annular or the approximated annular space, as well as the first visible portion 1041 is nested inside at least part of the frame formed by the sense region.

In a simple case, the first angle is 90 degrees when the cross section of the body device 101 is a square. At this point, the first visible portion 1041 and the sense region are on the same lateral surface perpendicular to the external surface of the annular or the approximated annular space concurrently, and the display direction of the first visible portion 1041 is in a direction perpendicular to the outward direction of the annular or the approximated annular space, as well as the first visible portion 1041 is nested inside at least part of a frame formed by the sense region.

For example, the display surface of the near-to-eye display and the touch surface of the touch screen are both on a lateral region, i.e., a lateral surface of the surface portion, e.g., a plane where a wind-up knob in the common watch is located or a plane connected with the strap portion, of the dial portion of the smart watch, and a frame of the display surface is formed by the touch surface, so as to enclose the periphery of the display surface entirely, as shown in FIG. 5B. However, it is appreciated readily by those skilled in the art that the disclosure is not limited thereto. For example, the display surface and the touch surface may also be both on the strap portion of the smart watch. Further, a portion in the frame of the display surface may also be formed by the touch surface, so as to enclose the periphery of the display surface partially.

Alternatively, the first angle may be other angles, such as 30 or 60 degrees, when the cross section of the body device 101 is a polygon.

In the second situation, the first display unit 104 and the sensing unit 106 are set concurrently on the holding device, e.g., the strap portion of the smart watch, or the first display unit 104 and the sensing unit 106 are set concurrently on the body device 101, e.g., the dial portion of the smart watch, as well as the first region and the sensing unit are on two planes with the first angle. In a simple case, the first region and the sense region are on two surfaces perpendicular to each other when the cross section of the body device 101 is a square, as described above. That is, the sense region, e.g., the touch surface, and the first visible portion 1041, e.g., the display surface of the near-to-eye display, may be set on two different planes perpendicular to each other. However, it is appreciated readily by those skilled in the art that the disclosure is not limited thereto. For example, the first region and the sense region may also be on two adjacent planes with some angle there between.

The different configuration examples of the first display unit and the sensing unit in the second situation will be depicted with reference to FIGS. 5C and 5D hereinafter.

Figure 5C:
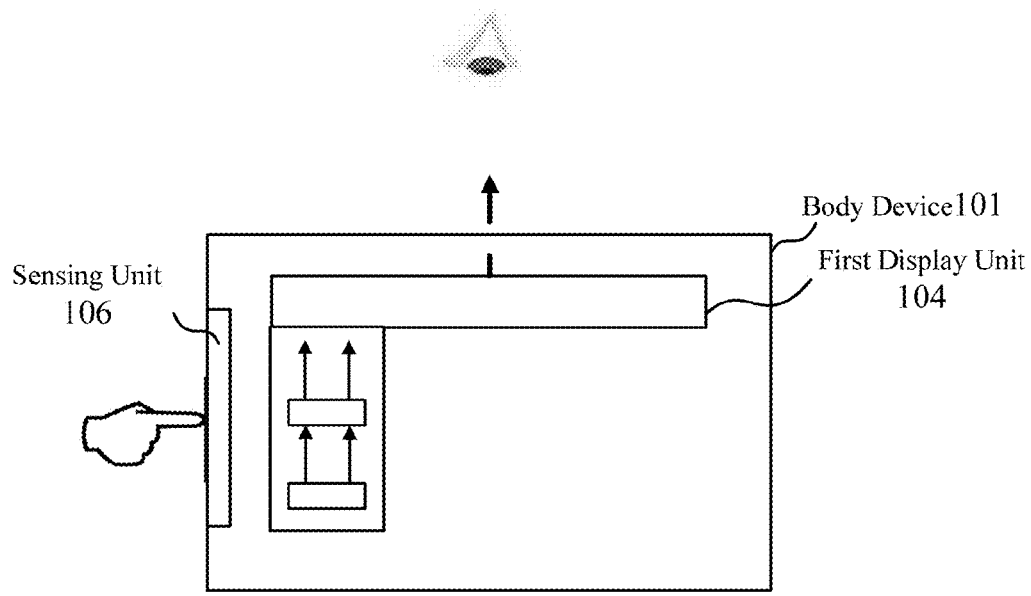
FIG. 5C is a side view illustrating a third configuration example of the sensing unit of the electronic apparatus in accordance with the first embodiment of the disclosure.

FIG. 5C is the side view illustrating the third configuration example of the sensing unit of the electronic apparatus in accordance with the first embodiment of the disclosure.

In the third configuration example, the first visible portion 1041 is on the external surface of the annular or the approximated annular space, and the display direction of the first visible portion 1041 is in the outward direction of the annular or the approximated annular space, as well as the sense region is on a lateral surface perpendicular, or more commonly, with the first angle, to the external surface of the annular or the approximated annular space. For example, the display surface of the near-to-eye display is on the frontal region of the dial portion, i.e., the top surface of the dial portion, of the smart watch, and the touch surface of the touch screen is on the lateral region of the dial portion, i.e., the lateral surface of the surface portion, e.g., the plane where the wind-up knob in the common watch is located or the plane connected with the strap portion, of the smart watch, as shown in FIG. 5C.

It is noted that, when the expression "two planes are perpendicular to each other" is present hereinafter, more generally, the two planes may have other first angles in addition to the 90 degrees there between as well.

Figure 5D:
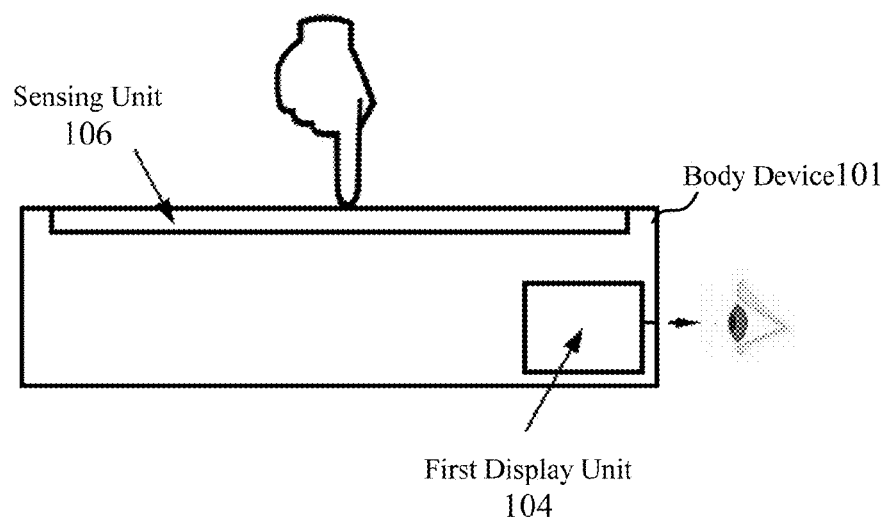
FIG. 5D is a side view illustrating a fourth configuration example of the sensing unit of the electronic apparatus in accordance with the first embodiment of the disclosure.

FIG. 5D is the side view illustrating the fourth configuration example of the sensing unit of the electronic apparatus in accordance with the first embodiment of the disclosure.

In the fourth configuration example, the first visible portion 1041 is on a lateral surface perpendicular to the external surface of the annular or the approximated annular space, and the display direction of the first visible portion 1041 is in a direction perpendicular to the outward direction of the annular or the approximated annular space, as well as the sense region is on the external surface of the annular or the approximated annular space. For example, the display surface of the near-to-eye display is on the lateral region of the dial portion, i.e., the lateral surface of the surface portion, e.g., the plane where the wind-up knob in the common watch is located or the plane connected with the strap portion, of the smart watch, and the touch surface of the touch screen is on the front surface region of the dial portion, i.e., the top surface of the dial portion, of the smart watch, as shown in FIG. 5D.

However, it is appreciated readily by those skilled in the art that the disclosure is not limited thereto. For example, it is possible that the first visible portion 1041 is on the first lateral surface with the first angle with respect to the external surface of the annular or the approximated annular space, and the display direction of the first visible portion 1041 is in a direction with the first angle with respect to the outward direction of the annular or the approximated annular space, as well as the sense region is on a second lateral surface with a second angle with respect to the external surface of the annular or the approximated annular space, and the second and first lateral surfaces are two lateral surfaces with a third angle there between. Apparently, any two among the first, second, and third angles may be identical or different.

In a simple case, that is, in the case where it is assumed that all of the first, second, and third angles are 90 degrees, the first visible portion 1041 is on the first lateral surface perpendicular to the external surface of the annular or the approximated annular space, and the display direction of the first visible portion 1041 is in the direction perpendicular to the outward direction of the annular or the approximated annular space, as well as the sense region is on the second lateral surface perpendicular to the external surface of the annular or the approximated annular space, and the second and first lateral surfaces are two lateral surfaces perpendicular to each other. For example, the display surface of the near-to-eye display is on the lateral region of the dial portion, i.e., the first lateral surface of the surface portion, e.g., the plane where the wind-up knob in the common watch is located, of the smart watch, and the touch surface of the touch screen is on the lateral region of the dial portion, i.e., a second lateral surface perpendicular to the first lateral surface of the surface portion, e.g., the plane connected with the strap portion in the common watch, of the smart watch.

Despite an illustration of different position relationships between the first display unit and the sensing unit in the second situation through the third to fourth configuration examples hereinabove. However, it is appreciated readily by those skilled in the art that the disclosure is not limited thereto. For example, the touch surface may not form the frame of the display surface, or may also form the entire or part of the frame of the display surface, so as to enclose the periphery of the display surface entirely or partially. The display surface and the touch surface may also be both on the strap portion of the smart watch.

Moreover, in the latter case, the first region and the sense region may be non-adjacent regions between which there is not a common side. That is, the relative position relationship between a display surface, i.e., the first region where the first visible portion 1041 is located, of the first display unit 104, e.g., which may be one near-to-eye display, and the sense region, e.g., a touch surface, of the sensing unit 106, e.g., the touch screen, is non-adjacent. More particularly, the latter case may also include two different situations as follows.

In a third situation, one of the first display unit 104 and the sensing unit 106 is set on the body device 101, e.g., the dial portion of the smart watch, and the other of the first display unit 104 and the sensing unit 106 is set on the holding device, e.g., the strap portion of the smart watch.

The different configuration examples of the first display unit and the sensing unit in the third situation will be depicted with reference to FIGS. 5E and 5F hereinafter.

Figure 5E:
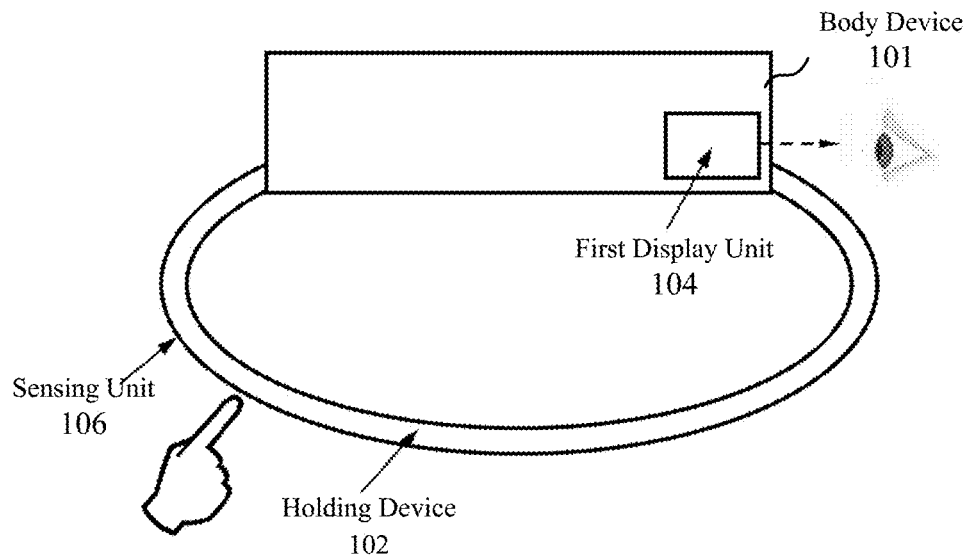
FIG. 5E is a side view illustrating a fifth configuration example of the sensing unit of the electronic apparatus in accordance with the first embodiment of the disclosure.

FIG. 5E is the side view illustrating the fifth configuration example of the sensing unit of the electronic apparatus in accordance with the first embodiment of the disclosure.

In the fifth configuration example, the first visible portion 1041 and the sense region are on the external surface of the annular or the approximated annular space concurrently, and the display direction of the first visible portion 1041 is in the outward direction of the annular or the approximated annular space. For example, the display surface of the near-to-eye display is on the lateral region of the dial portion, i.e., the lateral surface of the surface portion, e.g., the plane where the wind-up knob in the common watch is located or the plane connected with the strap portion, of the smart watch, and the touch surface of the touch screen is on the frontal region of the dial portion, i.e., the external surface of the dial region, of the smart watch, as shown in FIG. 5E.

That is, the touch screen is set on the strap portion of the smart watch, and the near-to-eye display system is set on the dial portion of the smart watch, as well as the output window is in the lateral direction of the watch, at this point, it is concerned that the touch screen may be used as an absolute or relative position control apparatus.

Figure 5F:
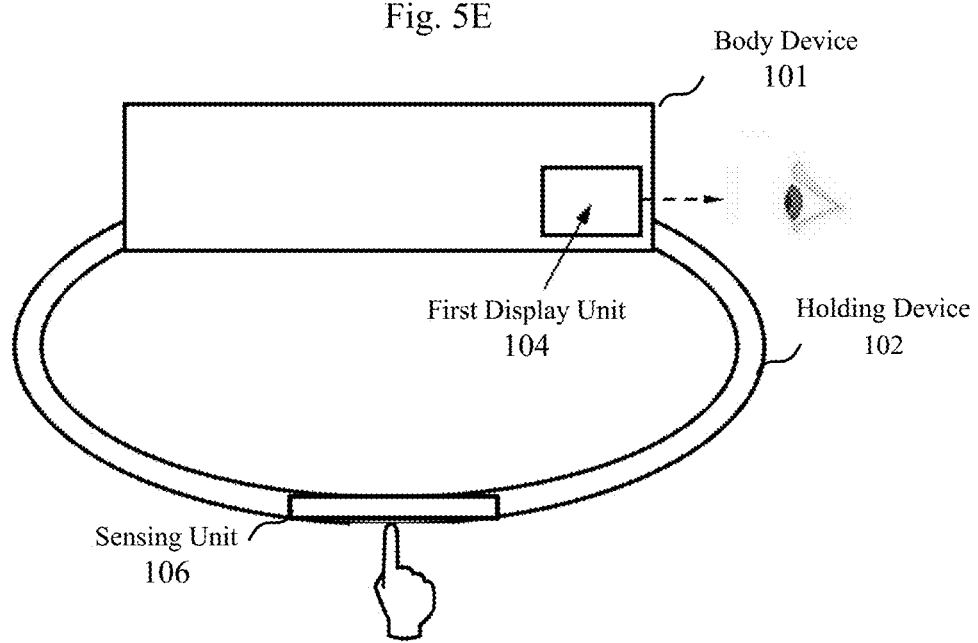
FIG. 5F is a side view illustrating a sixth configuration example of the sensing unit of the electronic apparatus in accordance with the first embodiment of the disclosure.

FIG. 5F is the side view illustrating the sixth configuration example of the sensing unit of the electronic apparatus in accordance with the first embodiment of the disclosure.

In the sixth configuration example, the direction of an outer normal line of the sense region and the image output direction of the first visible portion are opposite radially to each other in the annular or the approximated annular space. For example, the display surface of the near-to-eye display is on the lateral region of the dial portion, i.e., the lateral surface of the surface portion, e.g., the plane where the wind-up knob in the common watch is located or the plane connected with the strap portion, of the smart watch, and the touch surface of the touch screen is on the strap portion of the smart watch and distant farthest from the dial portion, making both of them on the opposite positions at a ring formed at the smart watch, as shown in FIG. 5F.

However, it is appreciated readily by those skilled in the art that the disclosure is not limited thereto. For example, the display surface of the near-to-eye display may also be on the front surface region of the dial portion, i.e., the top surface of the dial portion, of the smart watch, and the touch surface of the touch screen is on the front surface region of the strap portion, i.e., the external surface of the strap portion, of the smart watch, as well as both of them are arranged on two opposite positions across a radial direction of the holding device 102, that is, on the two ends distant farthest from each other on the annular formed by the smart watch. As such, an interactive operation may be performed conveniently on the sensing unit 106, when a graphic interface is viewed through the first display unit 104 by the user, and the user is enabled to know the extent and position of the touch operation conveniently according to feedback of the same direction or even the same extent of the displayed content for the touch operation, since the display direction of the first display unit 104 is just opposite to the touch input direction of the sensing unit 106.

In the fourth situation, the first display unit 104 and the sensing unit 106 are set concurrently on the holding device, e.g., the strap portion of the smart watch, or the first display unit and the sensing unit are set concurrently on the body device 101, e.g., the dial portion of the smart watch, as well as the first region and the sense region are on two opposite planes. For example, those two planes may be two completely or approximately parallel planes. That is, the sense region, e.g., the touch surface, and the first visible portion 1041, e.g., the display surface of the near-to-eye display, may be set on two different planes parallel completely or approximately with each other. However, it is appreciated readily by those skilled in the art that the disclosure is not limited thereto. For example, the first region and the sense region may also be on two adjacent planes with some angle there between.

The different configuration examples of the first display unit and the sensing unit in the fourth situation will be depicted with reference to FIG. 5G hereinafter.

Figure 5G:
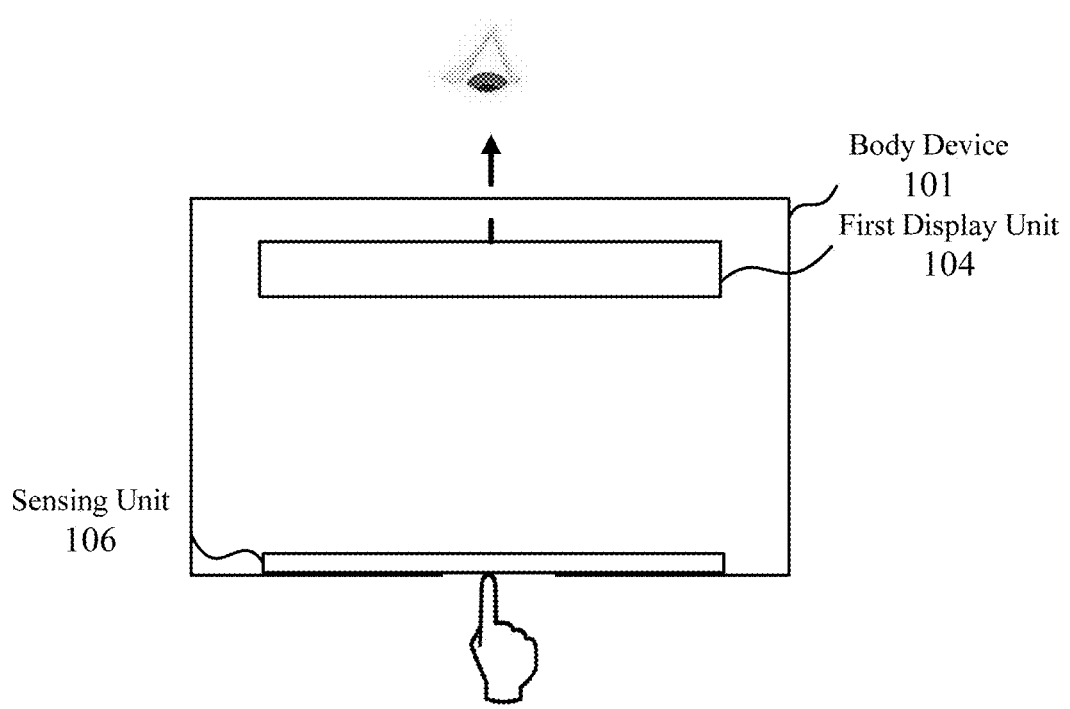
FIG. 5G is a side view illustrating a seventh configuration example of the sensing unit of the electronic apparatus in accordance with the first embodiment of the disclosure.

FIG. 5G is the side view illustrating the seventh configuration example of the sensing unit of the electronic apparatus in accordance with the first embodiment of the disclosure.

In the seventh configuration example, the first visible portion 1041 is on the external surface of the annular or the approximated annular space, and the display direction of the first visible portion 1041 is in the outward direction of the annular or the approximated annular space, as well as the sense region is on the internal surface of the annular or the approximated annular space. For example, the display surface of the near-to-eye display is on the front surface region of the dial portion, i.e., the top surface of the dial portion, of the smart watch, and the touch surface of the touch screen is on the back surface of the dial portion, i.e., the bottom surface of the dial portion, of the smart watch, as shown in FIG. 5G. As such, the display output and the touch input will not interfere with each other when the smart watch is held on the hand for use by the user, and the touch region of the touch screen is maximum, which enables the user to use the absolute position control corresponding one-to-one to both of the touch and display positions, such that a convenient input way is provided for the user, although such structure will cause the touch surface of the touch screen to be blocked by the wrist of the user when the smart watch is wore on the wrist.

An interactive operation may be performed conveniently on the sensing unit 106, when the graphic interface is viewed through the first display unit 104 by the user, and the user is enabled to know the extent and position of the touch operation conveniently according to feedback of the same direction or even the same extent of the displayed content for the touch operation, since the display direction of the first display unit 104 is just opposite to the touch input direction of the sensing unit 106, such that a user experience for the absolute or relative position control penetrating the electronic apparatus is provided for the user, extending the existing operation way.

However, it is appreciated readily by those skilled in the art that the disclosure is not limited thereto. For example, it is possible that the first visible portion 1041 is on the first lateral surface with the first angle with respect to the external surface of the annular or the approximated annular space, and the display direction of the first visible portion 1041 is in the direction with the first angle with respect to the outward direction of the annular or the approximated annular space, as well as the sense region is on the second lateral surface with a second angle with respect to the external surface of the annular or the approximated annular space, and the second and first lateral surfaces are two lateral surfaces opposite to each other. Apparently, the first and second angles may be identical or different.

In a simple case, that is, in the case where it is assumed that all of the first and second angles are 90 degrees, the first visible portion 1041 is on the first lateral surface perpendicular to the external surface of the annular or the approximated annular space, and the display direction of the first visible portion 1041 is in the direction perpendicular to the outward direction of the annular or the approximated annular space, as well as the sense region is on the second lateral surface perpendicular to the external surface of the annular or the approximated annular space, and the second and first lateral surfaces are two lateral surfaces opposite to each other. For example, the two lateral surfaces may be completely or approximately parallel, that is, the angle there between is less than a predetermined angle, e.g., 30 degrees.

Second Embodiment

In the second embodiment, the acquisition unit 106 may comprise an image capture unit for capturing an image so as to generate a first image capture signal.

For example, the acquisition unit 106 may be an image capture unit, e.g., a camera or an array of cameras, for capturing an image or video signal. In the electronic apparatus 100, such image capture unit may be used to take photos or videos simply, and to store them in the electronic apparatus 100 or to display them to the user through the first display unit 104.

The image capture unit may also be used to capture an action control operation generated by the operating object so as to generate the first image capture signal, and the processing unit 103 generates a first control signal according to the first image capture signal and controls the electronic apparatus 100 to perform the first control signal.

For example, the acquisition unit 106 may be the image capture unit, e.g., a camera, for capturing an interactive action of the operating object, e.g., an iris, a finger, a palm, a body action, a user gesture, and so on, in an image capture space. In the electronic apparatus 100, the image capture unit may be used to take a modality, a gesture action, or a body action of the user, such that the electronic apparatus is controlled by the processing unit 103 according to those actions to complete various operations.

A relative position relationship between the image capture unit 106 and the first display unit 104 and/or other units in the electronic apparatus 100 may be configured optimally, in order to ensure that the user is able to take images and/or input the interactive control operation to the electronic apparatus 100 more conveniently and flexibly by using the image capture unit 106 while viewing a response to such interactive control operation of the image capture unit and/or the electronic apparatus 100 by using the first display unit 104.

For example, for the near-to-eye optical display system, a sensing unit, e.g., a camera or other sensor, may be set at an appropriate position in a housing unit (the body unit) of the apparatus to recognize a motion of the hands for the interactive control.

The first display unit 104 comprises a first visible portion 1041 which is a portion viewed by the user so as to perceive or see a displayed content thereof in the first display unit and located on a first region, as described above. The image capture unit 106 has one image capture direction in which the action control operation generated by the operating object is captured by the image capture unit 106.

Particularly, in the first case, the image capture unit 106 may be the acquisition unit for capturing the actions of the irises and eyeballs of the user. That is, a vision positioning monitor unit may be integrated in the near-to-eye optical display system, such that a detection by fingerprint is replaced with a detection by iris to conduct an identity recognition and/or the touch input is replaced with a vision control to control the electronic apparatus to perform various operations. Such acquisition unit may acquire the action of the irises and eyeballs of the user synchronously while the displayed content is viewed through the first display unit 104, e.g., the near-to-eye display, by the user, in order to achieve the operations of authentication, vision control, and the like, such that the control action and the viewing action of the user are integrated together, simplifying the operations of the user. However, the present disclosure is not limited thereto. The acquisition operation of the acquisition unit may also be conducted individually independent of the display operation of the first display unit.

Thus, the first display unit 104 and the image capture unit 106 are set on the holding device 102, e.g., the strap portion of the smart watch, concurrently, or the first display unit 104 and the image capture unit 106 are set on the body device 101, e.g., the dial portion of the smart watch, concurrently, and the image capture direction of the image capture unit 106 is the same as the image output direction of the first visible portion 1041 of the first display unit 104. That is, when an iris detection or operation control is conducted by the image capture unit 106, e.g., an iris camera, the first display unit, e.g., the near-to-eye display, and the iris camera have to be on the dial or strap portions of the smart watch concurrently, and the image display direction and the image acquisition direction should be in an overlapped or approximately overlapped position relationship.

In the first situation, the first visible portion 1041 is on the surface of the annular or the approximated annular space, and the image capture unit 106 is inside the annular or the approximated annular space, the transmittance rate of the first visible portion 1041 is compliant with a predetermined condition in a direction opposite to the display direction, enabling the image capture unit 106 to capture the image through the first visible portion 1041. That is, the near-to-eye display is on the surface (the external or internal surface) of the dial or strap portion of the smart watch and is transparent, and the iris camera is set inside the near-to-eye display perpendicular to or parallel with it.

The different configuration examples of the first display unit and the image capture unit in the first situation will be depicted with reference to FIGS. 7A and 7B hereinafter.

Figure 7A:
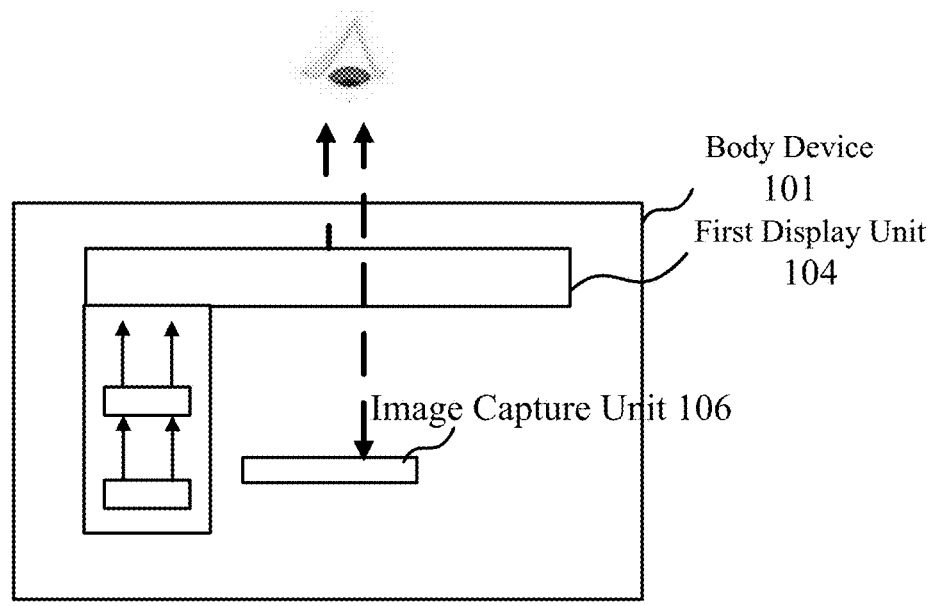
FIG. 7A is a side view illustrating a first configuration example of an image capture unit of the electronic apparatus in accordance with a second embodiment of the disclosure.

FIG. 7A is the side view illustrating the first configuration example of an image capture unit of the electronic apparatus in accordance with a second embodiment of the disclosure.

In the first configuration example, the image capture unit and the first visible portion have a fourth angle there between and are at least partly set to be overlapped, enabling the external light to be incident into the image capture unit across the first visible portion. For example, the fourth angle may have an angle less than 30 degrees. The fourth angle may be 0 degree, that is, the image capture unit and the first visible portion are set to be parallel and at least partly overlapped with each other. Thus, a refraction generated when the external light transmits through the first visible portion may be lowered to the minimum, causing more light to be incident into the image capture unit.

In one implementation of the first configuration example, the first visible portion 1041 is on the external surface of the annular or the approximated annular space, and the display direction of the first visible portion 1041 is in the outward direction of the annular or the approximated annular space, and the image capture unit 106 and the first visible portion 1041 are set to be parallel, or more generally, with the fourth angle, the same below, and at least partly overlapped with each other, enabling the external light to transmit through the first visible portion so as to be incident into the image capture unit 106. The near-to-eye display is set on the external surface of the dial or strap portion of the watch, and the transmittance rate is compliant with the predetermined condition in the outward direction of the annular or the approximated annular space, as shown in FIG. 7A. The predetermined condition may be that the transmittance rate is greater than or equal to a predetermined value, such as 70%. The iris camera is set inside the near-to-eye display parallel therewith, and overlapped with a projection of the near-to-eye display completely or partially. Thus, the first display unit 1041 may be enabled not to interfere with the image capture function of the iris camera, such that a more compact configuration is achieved.

It is to be noted that when the expression "the image capture unit 106 is parallel with the first visible portion 1041" is present hereinafter, more generally, the two apparatuses may have other fourth angles rather than 0 degree there between as well.

However, it is appreciated readily by those skilled in the art that the disclosure is not limited thereto. For example, it is possible in another implementation that the first visible portion 1041 is on the lateral surface perpendicular to, or more generally, with the first angle with respect to, the external surface of the annular or the approximated annular space, and the display direction of the first visible portion 1041 is in the direction perpendicular to, or more generally, with the first angle with respect to, the outward direction of the annular or the approximated annular space, as well as the image capture unit is set to be parallel with, or more generally, with the fourth angle with respect to, or at least part overlapped with the first visible portion 1041, enabling the external light to transmit through the first visible portion 1041 to be incident into the image capture unit. That is, the near-to-eye display may also be set on the lateral surface of the dial or strap portion of the watch, and the transmittance rate is compliant with the predetermined condition in the direction perpendicular to the outward direction of the annular or the approximated annular space, as shown in FIG. 7A. The iris camera is set inside the near-to-eye display parallel therewith, and overlapped with the projection of the near-to-eye display completely or partially.

Figure 7B:
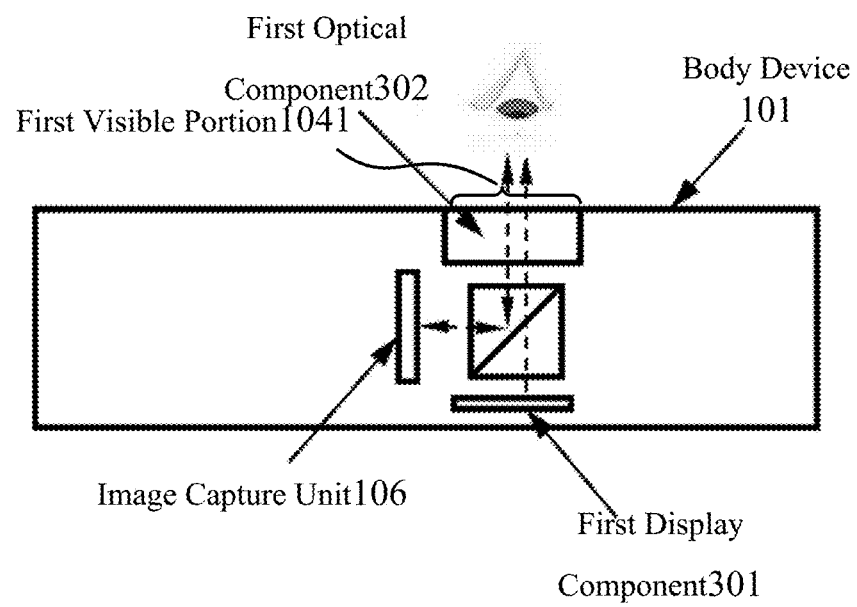
FIG. 7B is a side view illustrating a second configuration example of the image capture unit of the electronic apparatus in accordance with the second embodiment of the disclosure.

FIG. 7B is the side view illustrating the second configuration example of the image capture unit of the electronic apparatus in accordance with the second embodiment of the disclosure.

In the second configuration example, the image capture unit and the first visible portion are set with a fifth angle there between and not overlapped with each other, enabling the external light to transmit through the first visible portion so as to be incident into the annular or the approximated annular space, and then into the image capture unit via one reflective mirror. For example, the fifth angle may have any angle. The fifth angle may be 90 degrees, that is, the image capture unit is set to be perpendicular to the first visible portion. In that case, the reflective mirror may be set obliquely by an angle of 45 degrees with respect to the first visible portion and the image capture unit. However, the present disclosure is not limited thereto. The image capture unit, the first visible portion, and the reflective mirror may be set with any angle there among, as long as the external light transmitted through the first visible portion may be incident into the image capture unit by the reflective mirror.

It is stated that the reflective mirror is required to have necessarily a transmission function in a particular direction in addition to the reflective function, that is, the reflective mirror is a type of half-transmission and half-reflection lens, enabling the light corresponding to the first image, emitted from the first display component 301 to be delivered to the first optical component 302 while the external light transmitted through the first visible portion is incident into the image capture unit, such that the first optical component 302 conduct a light path conversion on the light corresponding to the first image to form an enlarged virtual image corresponding to the first image for viewing through the first visible portion 1041 by the user.

To this end, the reflective mirror may be a half-transparent glass lens of which the transmittance rate is greater than a predetermined value, such as 70%, in a first direction, and less than or equal to a predetermined value, such as 30%, in a second direction. Alternatively, the reflective mirror may also be the following optical components having two states of ON and OFF and switching between the two states quickly to transmit or reflect the external light in time division. That is, the light corresponding to the first image, emitted from the first display component 301 is capable of being sent to the first optical component 302 by the reflective mirror in the ON state, and the external light incident through the first visible portion 1041 is capable of being sent to the image capture unit 106 by the reflective mirror in the OFF state.

In one implementation of the second configuration example, the first visible portion 1041 is on the external surface of the annular or the approximated annular space, and the display direction of the first visible portion 1041 is in the outward direction of the annular or the approximated annular space, as well as the image capture unit 106 is set to be perpendicular to, or more generally, with the fifth angle with respect to, the same below, the first visible portion 1041, enabling the external light to transmit through the first visible portion 1041 so as to be incident into the annular or the approximated annular space, and then incident into the image capture unit 106 via one reflective mirror set obliquely by an angle of 45 degrees with respect to the first visible portion 1041 and the image capture unit 106. The near-to-eye display is set on the external surface of the dial or strap portion of the watch, and the transmittance rate is compliant with the predetermined condition in the outward direction of the annular or the approximated annular space, as shown in FIG. 7B. The predetermined condition may be that the transmittance rate is greater than or equal to a predetermined value, such as 70%. This iris camera is set inside the near-to-eye display, through which the external light is transmitted is received by the 45-degree reflective mirror, perpendicular therewith. To this end, a probe light source, e.g., an infrared, may be built in the iris camera and incident into the eyes of human via the 45-degree reflective mirror, and the movement of the eyeballs will transfer into the iris camera via a reverse path.

However, it is appreciated readily by those skilled in the art that the disclosure is not limited thereto. For example, it is possible in another implementation that the first visible portion 1041 is on the lateral surface perpendicular to, or more generally, with the first angle with respect to, the external surface of the annular or the approximated annular space, and the display direction of the first visible portion 1041 is in the direction perpendicular to, or more generally, with the first angle with respect to, the outward direction of the annular or the approximated annular space, as well as the image capture unit is set to be perpendicular to, or more generally, with the fifth angle with respect to, the first visible portion 1041, enabling the external light to transmit through the first visible portion 1041 to be incident into the annular or the approximated annular space, and then incident into the image capture unit via one reflective mirror set obliquely by 45 degrees with respect to the first visible portion 1041 and the image capture unit.

In the second situation, the first visible portion 1041 and the image capture unit 106 are on the surface of the annular or the approximated annular space concurrently, and the image capture unit 106 is set on at least part of the region around which the first visible portion is enclosed. That is, the near-to-eye display and the iris camera are on the surface (the external or lateral surface) of the dial or strap portion of the smart watch concurrently, and the iris camera constitutes the entire or part of the frame of the near-to-eye display.

The different configuration examples of the first display unit and the image capture unit in the second situation will be depicted with reference to FIGS. 7C and 7D hereinafter.

Figure 7C:
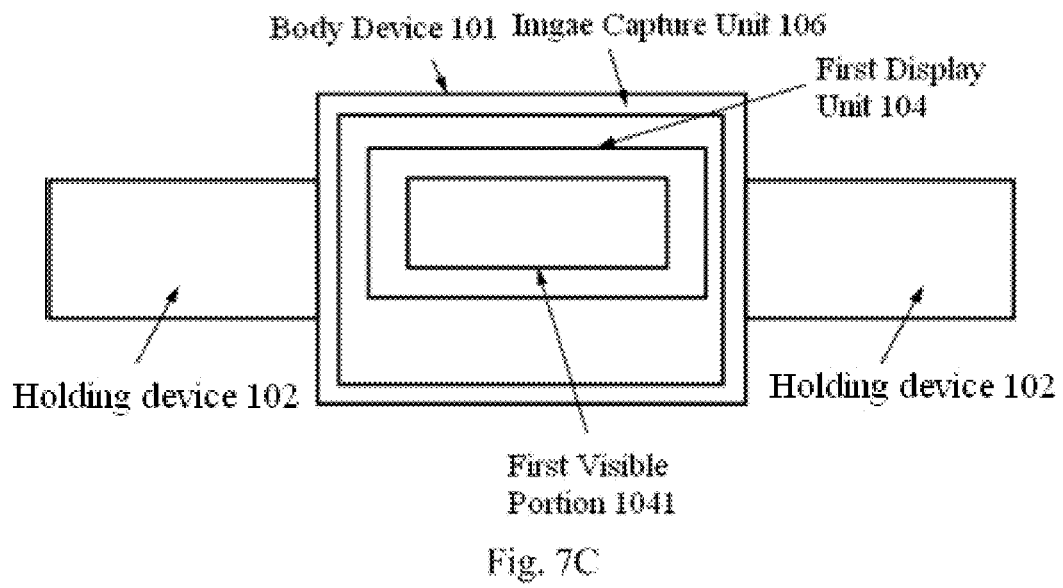
FIG. 7C is a top view illustrating a third configuration example of the image capture unit of the electronic apparatus in accordance with the second embodiment of the disclosure.

FIG. 7C is the top view illustrating the third configuration example of the image capture unit of the electronic apparatus in accordance with the second embodiment of the disclosure.

In the third configuration example, the first visible portion 1041 and the image capture unit 106 are on the external surface of the annular or the approximated annular space concurrently, and the display direction of the first visible portion 1041 is in the outward direction of the annular or the approximated annular space, and the first visible portion 1041 is nested inside at least part of the frame formed by the image capture unit 106. For example, the first visible portion 1041 of the near-to-eye display and the group of lenses of the camera are both on the frontal region of the dial portion, i.e., the top surface of the dial portion, of the smart watch, and the frame of the first visible portion 1041 is formed by the group of lenses, in order to enclose completely the periphery of the first visible portion 1041, as shown in FIG. 7C. However, it is appreciated readily by those skilled in the art that the disclosure is not limited thereto. For example, the near-to-eye display and the video camera may also be both on the strap portion of the smart watch. Further, a portion in the frame of the near-to-eye display may also be formed by the camera, so as to partially enclose the periphery of the near-to-eye display.

Figure 7D:
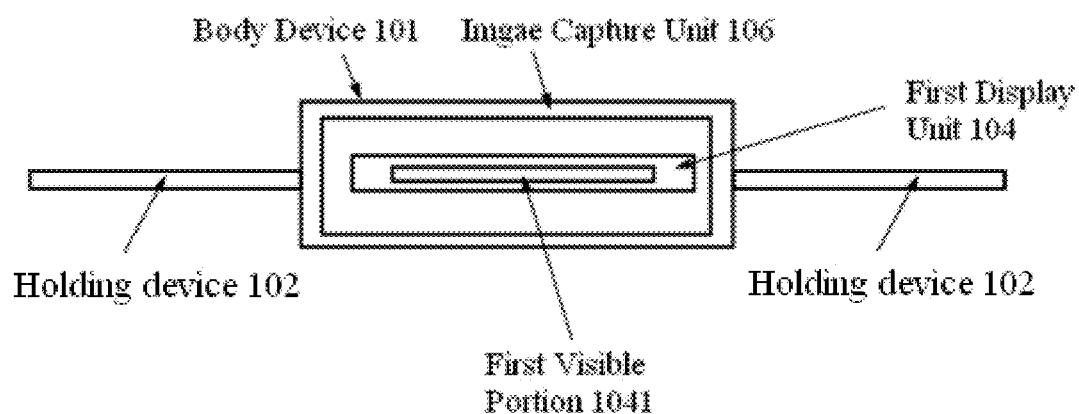
FIG. 7D is a side view illustrating a fourth configuration example of the image capture unit of the electronic apparatus in accordance with the second embodiment of the disclosure.

FIG. 7D is the side view illustrating the fourth configuration example of the image capture unit of the electronic apparatus in accordance with the second embodiment of the disclosure.

Similar to the third configuration example, in the fourth configuration example, the first visible portion 1041 and the image capture unit 106 are on the same lateral surface perpendicular to the external surface of the annular or the approximated annular space concurrently, and the display direction of the first visible portion 1041 is in the direction perpendicular to the outward direction of the annular or the approximated annular space, as well as the first visible portion 1041 is nested inside at least part of the frame formed by the image capture unit 106. However, it is appreciated readily by those skilled in the art that the disclosure is not limited thereto. For example, the near-to-eye display and the camera may also be both on the strap portion of the smart watch. Further, a portion in the frame of the near-to-eye display may also be formed by the camera, so as to enclose the periphery of the near-to-eye display partially.

In addition, particularly, in the second situation, the image capture unit 106 may be other image capture units, e.g., a common camera, rather than the iris camera, for a simple capture and storage of the image or a capture of the interactive actions in the image capture space by other operating objects, e.g., a finger, a palm, a body action, a user gesture, and so on.

To this end, the image capture direction of the image capture unit 106 is different from the image output direction of the first visible portion 1041 of the first display unit 104. That is, the image display direction and the image acquisition direction should be in a non-overlapped position relationship.

In the third situation, the first display unit 104 and the image capture unit 106 are set on the holding device 102, e.g., the strap portion of the smart watch, concurrently; or one of the first display unit and the image capture unit is set on the body device 101, e.g., the dial portion of the smart watch, and the other of the first display unit and the image capture unit is set on the holding device 102, e.g., the strap portion of the smart watch.

The different configuration examples of the first display unit and the image capture unit in the third situation will be depicted with reference to FIGS. 7E and 7F hereinafter.

Figure 7E:
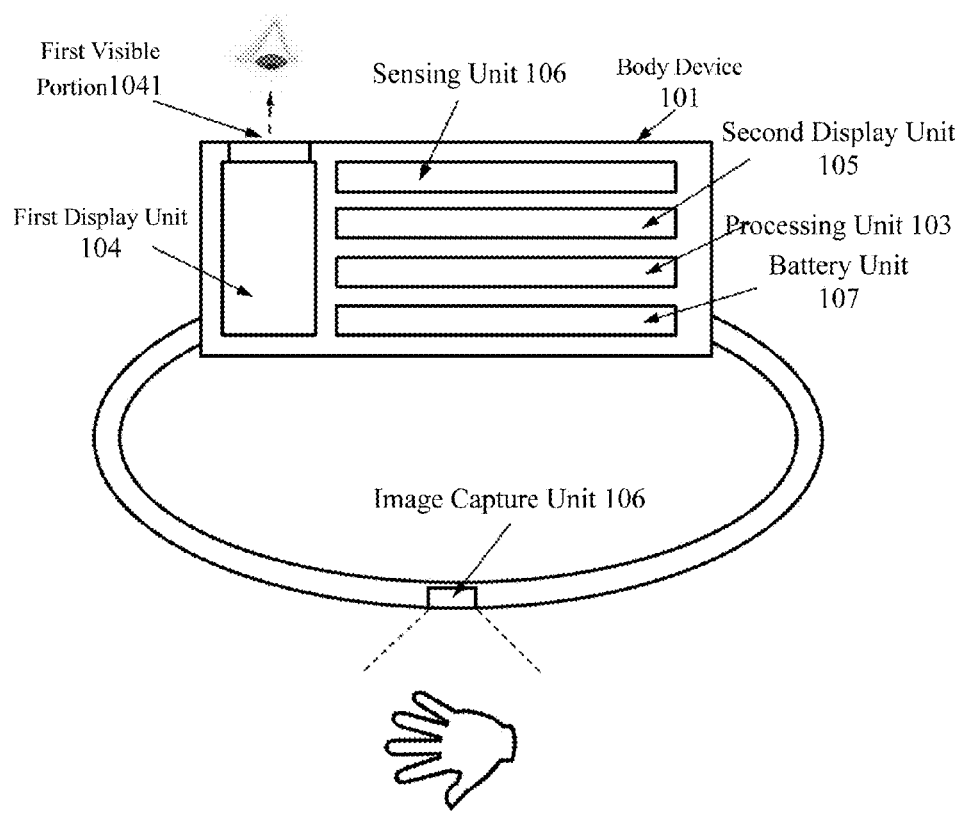
FIG. 7E is a side view illustrating a fifth configuration example of the image capture unit of the electronic apparatus in accordance with the second embodiment of the disclosure.

FIG. 7E is the side view illustrating the fifth configuration example of the image capture unit of the electronic apparatus in accordance with the second embodiment of the disclosure.

In the fifth configuration example, the image capture direction of the image capture unit 106 and the image output direction of the first visible portion 1041 are opposite radially to each other in the annular or the approximated annular space. For example, the near-to-eye display may be on the frontal region of the dial portion, i.e., the top surface of the dial portion, of the smart watch, and the group of lenses of the common camera is on the frontal region of the strap portion, i.e., the external surface of the strap portion, of the smart watch, and both of them are arranged at two opposite positions across the radial direction of the holding device 102, as shown in FIG. 7E. Similarly, the near-to-eye display may be on the frontal region of the strap portion, i.e., the external surface of the strap portion, of the smart watch, and the group of lenses of the common camera may also be on the frontal region of the strap portion, i.e., the external surface of the strap portion, of the smart watch, as well as both of them are arranged at two opposite positions across the radial direction of the holding device 102. In other words, one of the near-to-eye display and the common camera is on the dial portion of the smart watch, and the other is on the strap portion of the smart watch, or the near-to-eye display and the common camera are on the strap portion of the smart watch concurrently, and the near-to-eye display and the common camera are in a face-to-face position relationship on the annular formed by the watch. As such, when a live image captured by the image capture unit 106 is displayed on the first visible portion 1041, the user is enabled to view the image as transmitted through the electronic apparatus 200 by the first visible portion 1041, since the capture direction of the sensor unit 106 is coincident with the view direction of the eyes of the user.

It is stated that a processing unit 103, a second display unit 105, a sensing unit 106, and a battery unit 107, etc. may in practice be omitted in the present configuration example, despite those units are also illustrated in FIG. 7E.

Figure 7F:
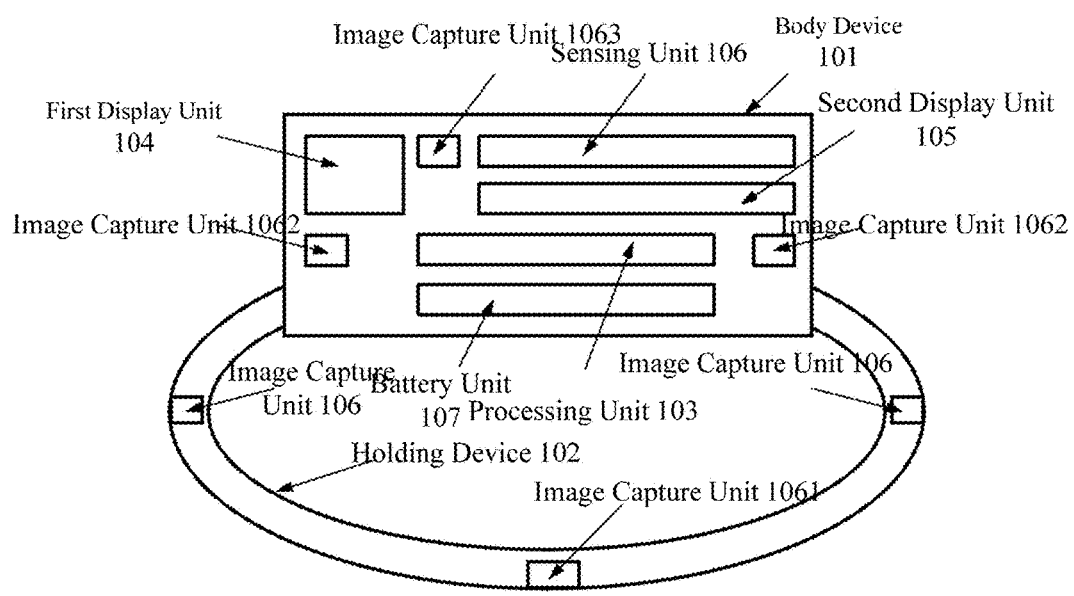
FIG. 7F is a side view illustrating a sixth configuration example of the image capture unit of the electronic apparatus in accordance with the second embodiment of the disclosure.

FIG. 7F is the side view illustrating the sixth configuration example of the image capture unit of the electronic apparatus in accordance with the second embodiment of the disclosure.

In the sixth configuration example, the image capture direction of the image capture unit and the image output direction of the first visible portion 1041 are perpendicular to each other radially in the annular or the approximated annular space. For example, the near-to-eye display may be on the frontal region of the dial portion, i.e., the top surface of the dial portion, of the smart watch, and the group of lenses of the common camera is on the frontal region of the strap portion, i.e., the external surface of the strap portion, of the smart watch, as well as both of them are arranged at two opposite positions perpendicular to each other in the radial direction of the holding device 102, as shown in FIG. 7F. Similarly, the near-to-eye display may be on the frontal region of the strap portion, i.e., the external surface of the strap portion, of the smart watch, and the group of lenses of the common camera may also be on the frontal region of the strap portion, i.e., the external surface of the strap portion, of the smart watch, as well as both of them are arranged at two opposite positions perpendicular to each other in the radial direction of the holding device 102. In other words, one of the near-to-eye display and the common camera is on the dial portion of the smart watch, and the other is on the strap portion of the smart watch, or the near-to-eye display and the common camera are on the strap portion of the smart watch concurrently, and the near-to-eye display and the common camera are in a perpendicular position relationship on the annular formed by the watch. Such position relationship makes the view direction in which the first display unit is viewed by the user be different from the photograph direction in which a view is found by the video camera, such that a user experience similar to a periscope is formed, by which it is convenient for the user to perform photographing process secretly.

It is stated that the processing unit 103, the second display unit 105, the sensing unit 106, and the battery unit 107, etc. may in practice be omitted in the present configuration example, despite those units are also illustrated in FIG. 7F. In addition, FIG. 7F further illustrates that the common camera may be at other positions, for example, the position at which the image capture units 1061 (in fact, equivalent to the fifth configuration example), 1062, and 1063 is located, rather than those described above, and other positions (not shown).

That is, various cameras for different usages may be set in respective directions in the housing unit, and may also be set in respective directions in the holding unit, such that it is convenient for the acquisition, interactive control, and Augmented Reality (AR) for the video and image. For example, the image may be captured and analyzed by the image capture unit 106, such that a recognition result obtained by analysis is displayed individually through the first visible portion 1041 or displayed with the picture displayed at the first visible portion 1041 overlapped.

In an application of Augmented Reality, the image from the natural world may be overlapped with that from the near-to-eye optical display system. For example, the real world is viewed by one eye of the user, and the auxiliary information is obtained through the near-to-eye optical display system by the other eye. In addition, the video and image from the real world may be acquired by the camera, input to the near-to-eye optical display system, and overlapped with the information which would have been displayed by the near-to-eye optical display system.

In the fourth situation, the first display unit 104 and the image capture unit 106 are set concurrently on the body device 101, e.g., the dial portion of the smart watch.

The different configuration examples of the first display unit and the image capture unit in the fourth situation will be depicted with reference to FIG. 7G hereinafter.

Figure 7G:
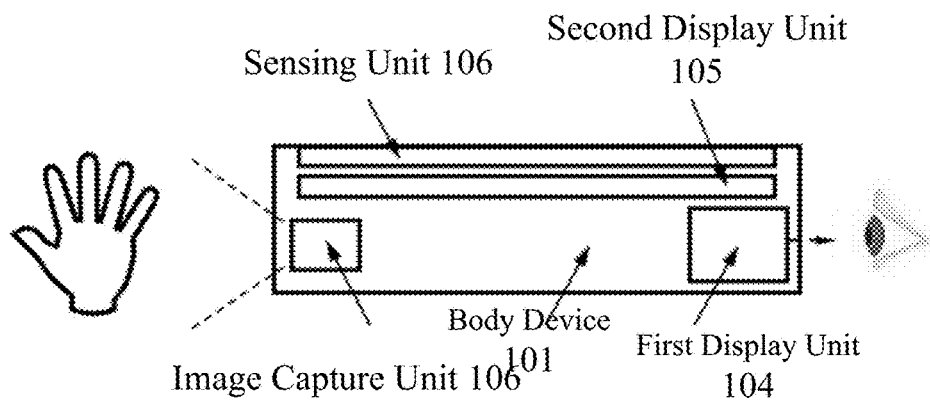
FIG. 7G is a side view illustrating a seventh configuration example of the image capture unit of the electronic apparatus in accordance with the second embodiment of the disclosure.

FIG. 7G is the side view illustrating the seventh configuration example of the image capture unit of the electronic apparatus in accordance with the second embodiment of the disclosure.

In the seventh configuration example, the first visible portion 1041 is on the first lateral surface perpendicular to the external surface of the annular or the approximated annular space, and the display direction of the first visible portion 1041 is in the direction perpendicular to outward direction of the annular or the approximated annular space, as well as the image capture unit 106 is on the second lateral surface perpendicular to the external surface of the annular or the approximated annular space, and the second and first lateral surfaces are two opposite lateral surfaces, the image capture direction of the image capture unit 106 is opposite to the display direction of the first visible portion 1041. For example, the near-to-eye display and the common camera are on the dial portion of the smart watch concurrently, and near-to-eye display and the common camera are in a face-to-face position relationship on the dial portion, as shown in FIG. 7G.

As such, when a live image captured by the image capture unit 106 is displayed on the first display unit 104, the user is enabled to view the image as transmitted through the electronic apparatus 100 by the first display unit 104, since the capture direction of the image capture unit 106 is coincident with the view direction of the eyes of the user.

However, it is appreciated readily by those skilled in the art that the disclosure is not limited thereto. For example, the first visible portion 1041 is on the external surface of the annular or the approximated annular space, and the display direction of the first visible portion 1041 is in the outward direction of the annular or the approximated annular space, as well as the image capture unit 106 is on the internal surface of annular or the approximated annular space, and the image capture direction of the image capture unit 106 is opposite to the display direction of the first visible portion 1041. That is, the near-to-eye display is on the external surface of the dial portion of the smart watch, and the common camera is on the internal surface of the dial portion of the smart watch. As such, the photograph habit of the user is satisfied most when the smart watch is held on the hand by the user, such that it is provided a convenient photographing way for the user, although such structure makes the group of lenses of the common camera to be blocked by the wrist of the user when the smart watch is worn on the wrist.

To this end, in the case where one closed annular-like space is formed by the holding device 102 in a holding state, the holding device 102 further comprises one open state. Thus, the holding device 102 is switched from the holding state to the open state for a completion of the photograph operation by the user, which avoids a view finding position for the image capture unit 106 from being blocked. Alternatively, in the case where one non-closed approximated annular space is formed by the holding device 102 in the holding state, the holding device 102 may also comprise one open state, or may set the holding device 102 to make the opening portion adjacent to the approximated annular space to be aligned with the image capture direction of the image capture unit 106, and set the size of the opening portion so that the view finding position of the image capture unit 106 at least cannot be blocked, that is, make the holding device 102 not to be present within an imaging range of the image capture unit 106.

Third Embodiment

In the third embodiment, the acquisition unit 106 may comprise a sound capture unit for capturing a sound so as to generate a first sound capture signal.

For example, the acquisition unit 106 may be a sound capture unit for capturing an audio signal, e.g., a microphone or an array of microphones. In the electronic apparatus 100, the sound capture unit may be used to record the audios simply, and store them in the electronic apparatus 100 or play them to the user through a sound play unit, such as a speaker.

The sound capture unit may also be used to capture a sound control operation generated by the user so as to generate the first sound capture signal, and the processing unit 103 generates a first control signal according to the first sound capture signal and controls the electronic apparatus 100 to perform the first control signal.

For example, the acquisition unit 106 may be the sound capture unit, e.g., a microphone, for capturing and recognizing a voice command of the user. In the electronic apparatus 100, the electronic apparatus is controlled by the processing unit 103 to complete various operations according to those voice commands.

In order to ensure the user is able to record the sound efficiently by using the sound capture unit 106 for a purpose of sound record, etc., the relative position relationship between the sound capture unit 106 and the image capture unit and/or other units in the electronic apparatus 100 may be configured optimally.

Particularly, in the first case, the electronic apparatus 100 may also comprise an image capture unit for capturing the image to generate the first image capture signal, as described above. The sound capture unit 106 and the image capture unit are set concurrently at the adjacent positions on the holding device 102, or the sound capture unit and the image capture unit are set concurrently at the adjacent positions on the body device 101. That is, the microphone and the camera are set adjacently, such that a sound signal related to the video taken by the camera is acquired by the microphone.

For example, in the case where the smart watch comprises a plurality of cameras and a plurality of microphones, when a certain camera therein is recording video, one or more microphones adjacent to the camera and oriented identically may be enabled, and the other microphones are turn off, to achieve an directional acquisition.

Particular, in the second case, the sound capture unit 106 may be a set of acquisition units arranged at respective positions of the electronic apparatus 100 and used to capture the voice of the user or the sound from other sound source in different angles.

To this end, the sound capture unit 106 is an array of sound capture units comprising a plurality of sound capture subunits, each sound capture subunit in the array of sound capture units is set spaced on at least one of the body device and the holding device, and each sound capture subunit is made to capture the sound so as to generate the first sound capture signal when the sound is made by the user, and the processing unit 103 compares the intensities of the first sound capture signals generated by each sound capture subunit, and turns off other sound capture subunits other than those by which the first sound capture signals generated have the maximum intensities. That is, each microphone in the array of microphones can be controlled to be switched according to the sound intensity.

However, it is appreciated readily by those skilled in the art that the disclosure is not limited thereto. Particularly, the array of microphones can be switched in other manners. For example, one or more microphones in a work state may be controlled automatically depending on specific application. For example, when the camera is used to take video, one or more microphones at the same side may be turned on, so as to obtain a best audio stream. Alternatively, when the smart watch is used for a voice event record by the user, one or more microphones nearest to the mouth of the user may be turned on, or one or more microphones convenient most for a sound record operation, e.g., one or more microphones on the dial of the watch, may be turned on. Alternatively, apparently, the array of microphones may be turned on and off selectively through a manual control by the user.

Further, in addition to working selectively, all microphones in the array of microphones may also work concurrently, such that the concerned sound and the ambient noise are recorded in different angles, and the interference is shielded subsequently by the operations of comparison, recognition, filteannular, and the like, in order to achieve the directional acquisition. For example, when three persons are speaking in front of the electronic apparatus at present, the electronic apparatus may be made to retain the sound of one or two of those persons and eliminate the sound of others by recognizing and filteannular the sound of the three persons, so as to satisfy the special requirement of the user.

Fourth Embodiment

In the fourth embodiment of the disclosure, the acquisition unit 106 may comprise a biometric capture unit for capturing a first biometric information of the user.

For example, the acquisition unit 106 may be a biometric sensor for capturing the biometric feature. More particularly, the biometric feature may be divided into an external biometric feature comprising a fingerprint, a palm print, an iris, a voice print, and the like, and an internal biometric feature comprising an electromyography, a body temperature, a cardiac rate, a blood glucose content, a vena state, and a calorie consumption, etc. Accordingly, in the case of the external biometric feature, the biometric sensor may be a touch screen for capturing the fingerprint and/or the palm print, and may also be a camera for capturing the fingerprint, the palm print, and/or the iris, and may also be a microphone for capturing the sound print, and may also be an electromyography sensor for capturing the electromyography. In the case of the internal biometric feature, the biometric sensor may be a common thermometer, a cardiotachometer, a blood glucose meter, a calorie meter, and the like, for capturing the internal biometric features of the body temperature, the cardiac rate, the blood glucose content, the vena state, and the calorie consumption, etc., respectively. In the electronic apparatus 100, the biometric capture unit 106 may be used to capture the biometric feature simply, and store them in the electronic apparatus 100 or display them to the user through the first play unit, such as a display.

More particularly, in the case where the biometric feature is the electromyography, a muscle motion may be detected by the electromyography. For example, a skin may be measured by the sensor built in the system to detect the electromyography, and then the action parameters of the hands and the fingers of the user are obtained, and the motion parameters of the hands and the fingers of the user are known in conjunction with other sensors, e.g., an acceleration sensor, built in the system. Synthesizing those two types of parameters, an action made in the air by the hands of the user with a gesture or hand form is known for an interactive control of the local apparatus or other apparatus.

In the case where the biometric feature is the calorie consumption, the sensor, e.g., an acceleration sensor, built in the system may be used to acquire a motion condition of the user, analyze a statistic calorie consumption, monitor the motion condition and adjust a workout plan by cooperating with the user effectively.

Furthermore, those biometric features may be acquired dedicatedly, that is, independently of a step by which an interactive control operation input by the user is received therefrom by an operation input unit, and a single acquisition process is required for the biometric capture unit 106 to acquire the biometric features.

Alternatively, those biometric features may be operating while being acquired, that is, the biometric features are acquired through an acquisition process by that biometric capture unit 106, while the interactive control operation input by the user is received therefrom by the operation input unit. Thus, the control input and the biometric acquisition may be conducted synchronously, and twice operations are not required, even the user may be made to complete the biometric acquisition without any consciousness, which eliminates successfully a danger (fear) of difficulty occurred when the biometric features are acquired by the user individually.

To this end, the electronic apparatus 100 further comprises an operation input unit set on at least one of the body device and the holding device, which is used to obtain an interactive control operation input by the user to generate a first operation input signal, and while the interactive control operation is obtained by the operation input unit, the first biometric feature information is obtained by the biometric capture unit 106, and the processing unit generates a first control signal according to the first operation input signal and controls the electronic apparatus to perform the first control signal. For example, the operation input unit may be any type of input unit, such as the sensing unit, the image capture unit, the sound capture unit as described above, or a simple mouse, a keyboard, or a keypad, etc.

The operation input unit and the biometric capture unit may also be a single unit integrated together with each other. Alternatively, the operation input unit and the biometric capture unit may also be separate two units.

In the first implementation, it is assumed that the operation input unit is a touch screen and the biometric capture unit is an iris camera, then in the smart watch 100, the iris camera in the visible region of the eyes of the user may be activated while the touch screen is used by the user to plot an interactive gesture for controlling the smart watch, and the iris camera is made to capture an iris image of the user as the biometric information for storage, display, or other usage.

The operation input unit and the biometric sensor may be the same device.

In the second implementation, it is assumed that the operation input unit is the touch screen and the biometric capture unit is also the touch screen, then in the electronic apparatus 100, a fingerprint of the finger by which an interactive gesture is plotted by the user may recognized by the touch screen, and the fingerprint is recognized, while the interactive gesture is plotted by using the touch screen by the user to control the smart watch.

After the biometric features are captured, in addition to a simple storage and display of them, the biometric features may also be used to authenticate the operations of the user for providing a safety of the electronic apparatus 100.

To this end, before the electronic apparatus is controlled by the processing unit to perform the first control signal, the processing unit obtains a reference biometric information, decides whether the first biometric information matches the reference biometric information, and obtains a first decision result, and controls the electronic apparatus to perform the first control signal if the first decision result indicates that the first biometric information matches the reference biometric information.

Thereby, in the first and second implementation as described above, after the first biometric information, such as the iris and the fingerprint, of the user is obtained, the smart watch may determine whether the current user has the right to control the electronic apparatus to perform the operations desired by using the first biometric information to compare with the reference biometric information.

In that case, the reference biometric information may be stored in a local memory, such that the entire authentication procedure is able to be completed locally and quickly. Alternatively, the reference biometric information may also be stored at the remote, e.g., a cloud server, in order to save the storage space in the smart watch, at that time, the electronic apparatus 100 comprises a communication unit for downloading the reference biometric information from the remote, so as to ensure that the operation is able to be authenticated locally in advance. Alternatively, the communication unit may be used to send the first biometric information to the cloud server, causing the authentication operation for the information comparison to be completed at the cloud, and used to receive a result of the authentication from the cloud server, such that the processing unit 103 determines how to make a response.

As noted above, the biometric information may include the internal biometric information of the user, such as the electromyography, the body temperature, the cardiac rate, the blood glucose content, the vena state, and the calorie consumption, etc. At this point, a biometric sensor may be located in the housing unit or the holding unit, and may contact directly with the skin or separate from the skin by a distance. And, the biometric sensor may be various different types of sensors for monitoannular a human medical parameters, seveannular to the physical and psychological health of the user.

Figure 8:
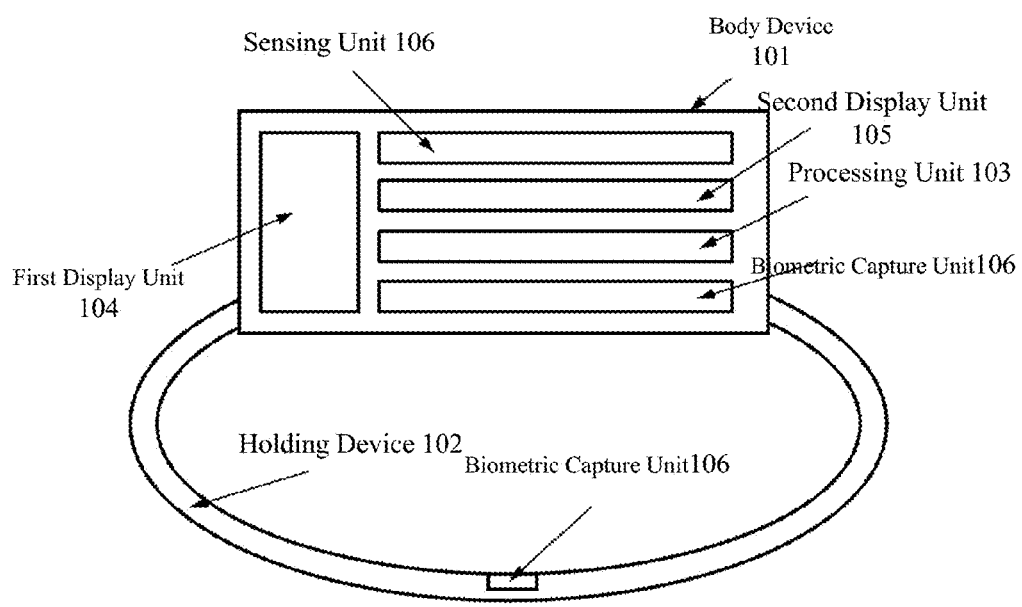
FIG. 8 is a side view illustrating a configuration example of a biometric capture unit of the electronic apparatus in accordance with a fourth embodiment of the disclosure.

FIG. 8 is the side view illustrating the configuration example of a biometric capture unit of the electronic apparatus in accordance with a fourth embodiment of the disclosure.

As described above, when the biometric information is an information associated with the internal biometric of the user, an acquisition direction of the biometric capture unit is in the inward direction of the annular or the approximated annular space. For example, the biometric capture unit 106 may be arranged at a position where the smart watch contacts with the body of the user physically, in particular, arranged on a position with which the interior of the smart watch of the wrist of the user is able to be contacted, in order to serve as an electromyography sensor for capturing an electromyography, a common thermometer, a cardiotachometer, a blood glucose meter, a blood pressure meter, a calorie meter, and the like for capturing a body temperature, a cardiac rate, a blood glucose content, a vena state, and a calorie consumption, etc., respectively, as shown in FIG. 8.

Furthermore, the biometric information may include the external biometric information of the user. The position at which the biometric capture unit is located in electronic apparatus when the biometric information is the external biometric information will be depicted with reference to the configuration example hereinafter.

In the first configuration example, the biometric capture unit comprises a sensing unit for sensing a sense control operation generated by the operating object touching or near touching the sense region to generate a first sense signal, and obtaining the first biometric information according to the first sense signal.

That is, such biometric sensor may be a touch screen for capturing the fingerprint and/or the palm print of the user. The touch screen may capture the related information when the user places finger (or palm) on the touch screen in order to input the fingerprint (or the palm print) simply; and may also capture the related information when the user presses finger on the touch screen in order to perform a click operation or slides finger on the touch screen in order to perform a sliding operation.

The position where the sensing unit is located in the electronic apparatus can be seen in the related conditions as described with reference to FIGS. 5A to 5G in the first embodiment as describe above.

Moreover, in the second configuration example, the biometric capture unit comprises an image capture unit for capturing an action control operation generated by the operating object to generate a first image capture signal, and obtaining the first biometric information according to the first image capture signal.

That is, such biometric sensor may be a camera for capturing the fingerprint, the palm print, and/or the iris of the user. The camera may capture the related information when the user aligns the finger, the palm, and/or the eyeball with the camera in order to input the fingerprint, the palm print, and/or the iris simply; and may also capture the related information when the user presses finger or blinks, etc., in order to perform a click operation or moves the finger or rotates the eyeball, etc., in order to perform a sliding operation.

The position where the image capture unit is located in the electronic apparatus can be seen in the related cases as described with reference to FIGS. 7A to 7G in the second embodiment describe above.

Moreover, in the third configuration example, the biometric capture unit comprises a sound capture unit for capturing a sound control operation generated by the user to generate a first sound capture signal, and obtaining the first biometric information according to the first sound capture signal.

That is, such biometric sensor may be a microphone for capturing the sound print of the user. The microphone may capture the related information when the user speaks a sentence casually in order to input the sound print simply; and may also capture the related information when the user speaks a name of a menu button in order to perform certain menu selection operation.

The position where the sound capture unit is located in the electronic apparatus can be seen in the related cases as described in the third embodiment describe above.

Fifth Embodiment

In the fifth embodiment of the disclosure, the acquisition unit 106 may comprise a distance detection unit for detecting a first distance between the object and the distance detection unit, and generating a first operation trigger signal according to a relative relationship between the first distance and a threshold distance. The processing unit generates a first control signal according to the first operation trigger signal, and controls the electronic apparatus to perform the first control signal.

For example, the distance detection unit 106 may be an proximity sensor for deciding a distance between the object and the electronic apparatus, enabling the processing unit 103 to trigger the electronic apparatus to perform different operations according to different distances there between.

Figure 9A:
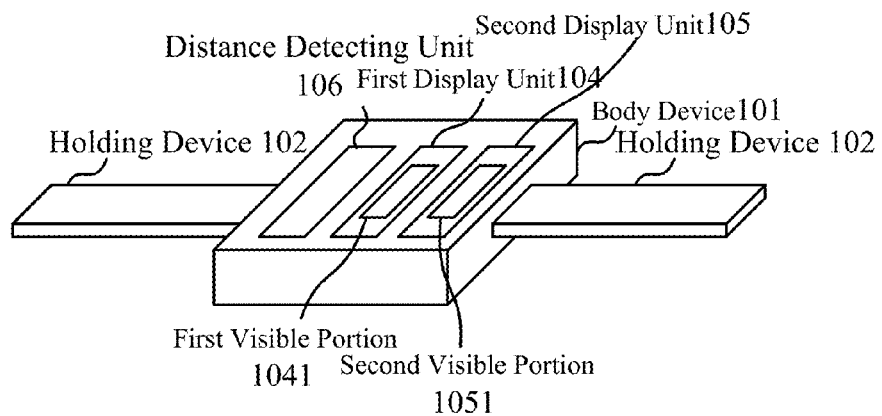
FIGS. 9A to 9C are structural block diagrams illustrating the electronic apparatus in accordance with a fifth embodiment of the disclosure.
Figure 9B:
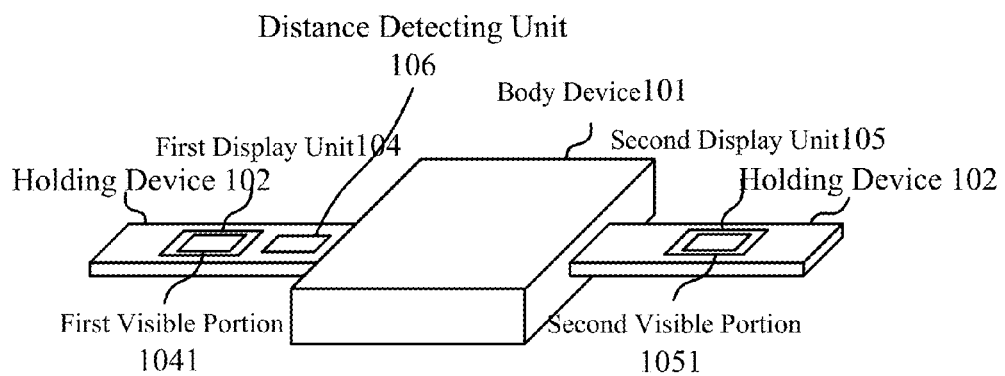
Figure 9C:
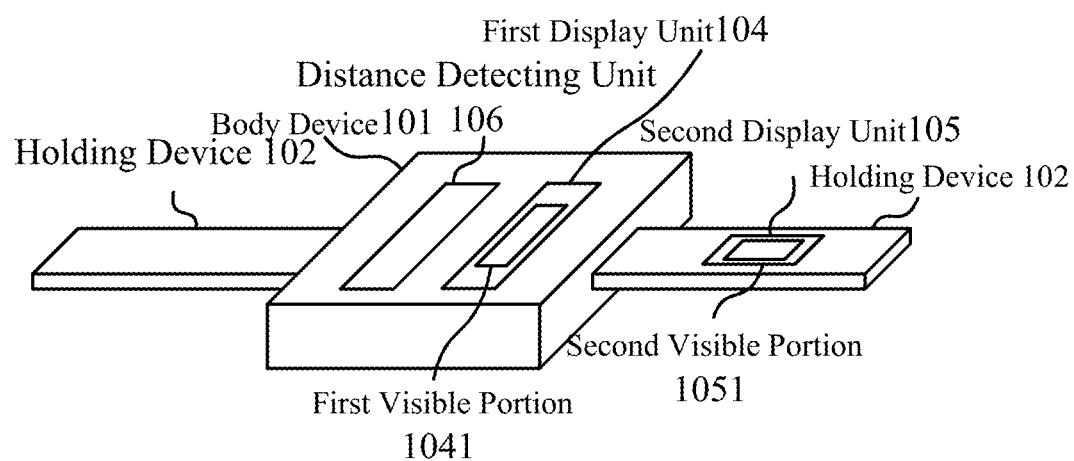

FIGS. 9A to 9C are block diagrams illustrating the structure of the electronic apparatus in accordance with the fifth embodiment of the disclosure.

In addition to the first display unit 104, a second display unit 105 is also arranged on the body device 101, as shown in FIGS. 9A to 9C. The processing unit 103 is utilized to generate an image to be displayed and perform a display control. The second display unit 105 is utilized to output a second image. More particularly, the second image generated by the processing unit 103 is output by the second display unit 105 under the display control performed by the processing unit 103. The second display unit 105 is arranged on the body device 101 in the electronic apparatus 100 shown in FIG. 9A. However, it is appreciated readily by those skilled in the art that the disclosure is not limited thereto. For example, for example, the second display unit 105 may also be arranged on the holding device 102 in the electronic apparatus 100 shown in FIGS. 9B and 9C.

The second display unit 105 is a display unit complying with various display principles. For example, the second display unit 105 may be a conventional optical display system comprising, but not limited to, a liquid crystal display unit, an organic electroluminance display unit, an organic light-emitting diode display unit, an E Ink type of display unit, and the like. The second display unit 105 is a display unit 104 of which the type is different from that of the first display unit.

More particularly, the second display unit 105 may comprise a second visible portion 1051 which is a portion viewed by the user so as to perceive or see a displayed content in the second display unit 105. That is, the second display unit 105 as described below contains a plurality of members depending on the principle thereof, and wherein the second visible portion 1051 is a region in which a display of the image content is observed actually by the user. At this point, a position of the second display unit 105 described above may in fact refer to the position of the second visible portion 1051.

The different configuration examples of the first and second visible portion will be depicted with reference to FIGS. 10A to 10F hereinafter.

Figure 10A:
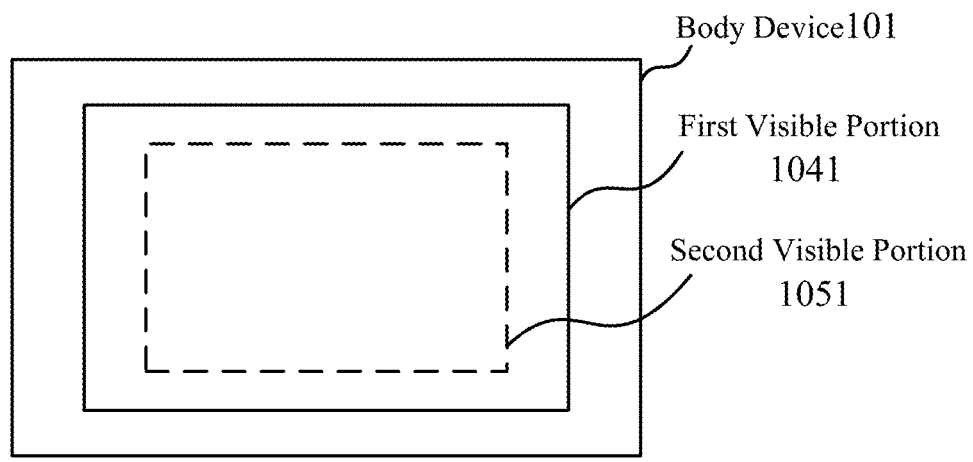
FIGS. 10A and 10B are the top and side views illustrating a first configuration example of a visible portion of the electronic apparatus in accordance with the embodiment of the disclosure, respectively.
Figure 10B:
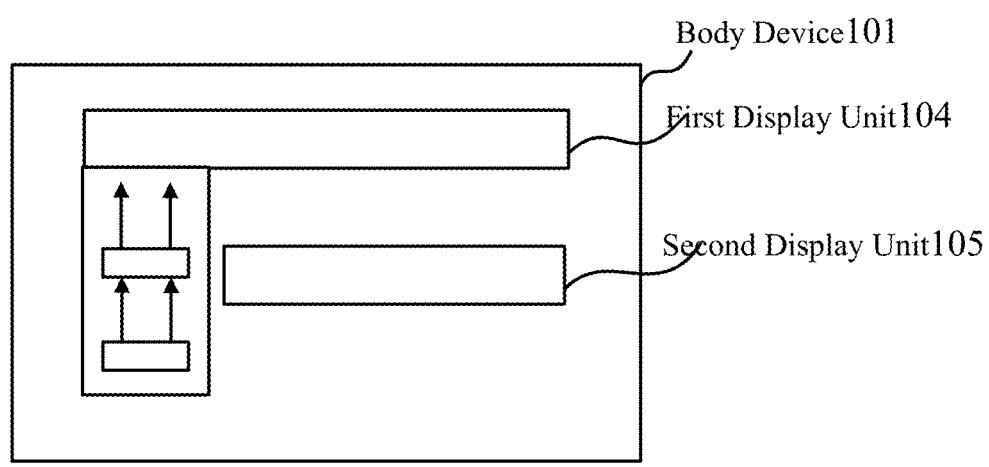

FIGS. 10A and 10B are the top and side views illustrating a first configuration example of a visible portion of the electronic apparatus in accordance with the embodiment of the disclosure, respectively.

The first and second visible portions 1041 and 1051 have the first configuration example of setting to be overlapped at the body device 101, as shown in FIG. 10A. The disclosure is not limited thereto, and the first and second visible portions 1041 and 1051 may also be set to be overlapped on the holding device 102.

The side view of the first configuration example in which the first and second visible portions 1041 and 1051 have an overlapped setting is further illustrated in FIG. 10B. The first display unit 104 is configured with the first visible portion 1041 and the second display unit 105 is configured with the second visible portion 1051, as shown in FIG. 10B. The first and second visible portions 1041 and 1051 are made to be at least at the visible portion of the exterior of the annular or the approximated annular space, and the transmittance rate is compliant with a predetermined condition in the outward direction of the annular or the approximated annular space, as shown in FIG. 10B. The predetermined condition may be that the transmittance rate is greater than or equal to a predetermined value, such as 70%. In the examples as shown in FIGS. 10A and 10B, the first visible portion 1041 is caused to be at the exterior. The disclosure is not limited thereto, and the second visible portion 1051 may also be caused to be at the exterior. Causing the transmittance rate of the first visible portion 1041 to be greater than or equal to a predetermined value, only one of the first and second visible portions 1041 and 1051 is caused to be in displaying, and the visible portion not in displaying will not interfere with the display function of the visible portion in displaying, such that a more compact configuration is achieved.

Figure 10C:
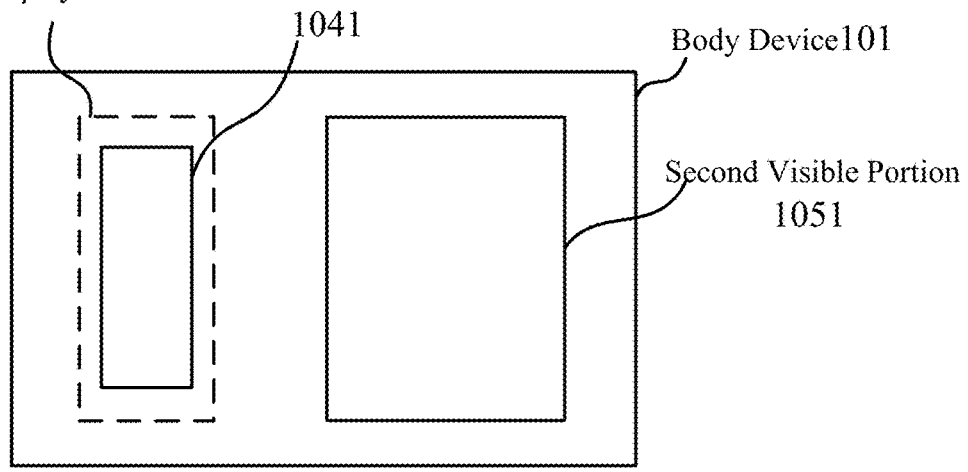
FIGS. 10C and 10D are the top and side views illustrating a second configuration example of the visible portion of the electronic apparatus in accordance with the embodiment of the disclosure, respectively.
Figure 10D:
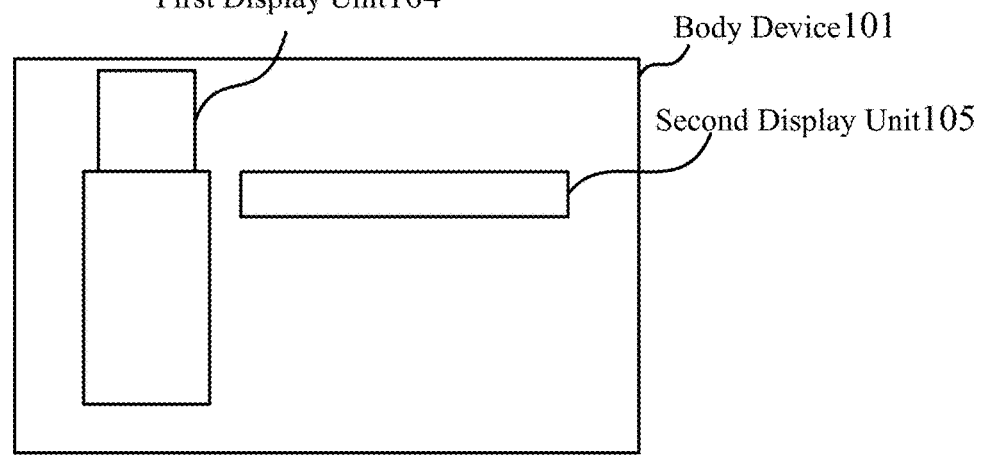

FIGS. 10C and 10D are the top and side views illustrating the second configuration example of the visible portion of the electronic apparatus in accordance with the embodiment of the disclosure, respectively.

The first and second visible portions 1041 and 1051 have the second configuration example set to be adjacent on the body device 101 or the holding device 102, as shown in FIG. 10C. In FIGS. 10C and 10D, the first and second visible portions 1041 and 1051 are set to be adjacent in the body device 101. The disclosure is not limited thereto, the first and second visible portions 1041 and 1051 may be set at the body device 101 and the holding device 102 respectively, and the distance between the first and second visible portions 1041 and 1051 is less than a threshold, such as 1 centimeter.

The side view of the second configuration example in which the first and second visible portions 1041 and 1051 have an overlapped setting is further illustrated in FIG. 10D. The first and second display units 104 and 105 configured with the first and second visible portions 1041 and 1051 are set to be adjacent as shown in FIG. 10D, and the display directions of the first and second visible portions 1041 and 1051 are both on the outward direction of the annular or the approximated annular space, as shown in FIG. 10D.

Figure 10E:
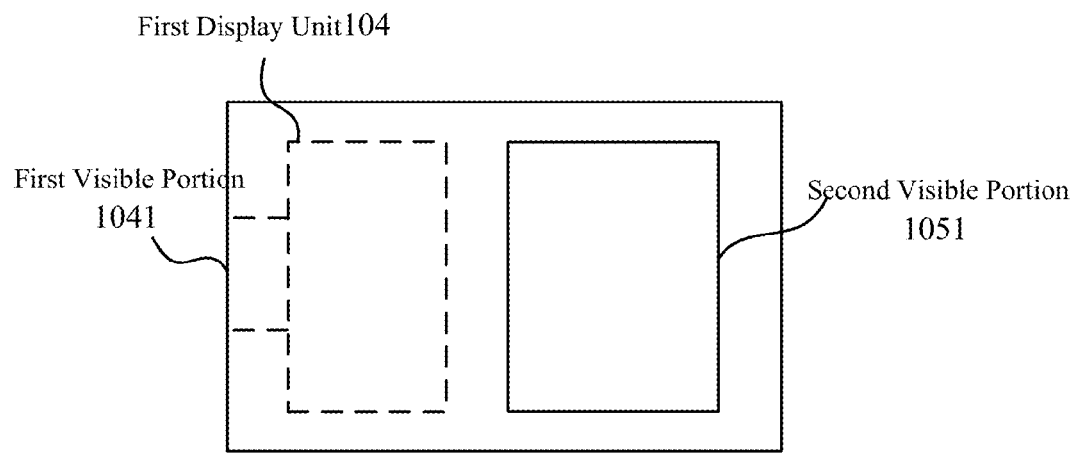
FIGS. 10E and 10F are the top and side views illustrating a third configuration example of the visible portion of the electronic apparatus in accordance with the embodiment of the disclosure, respectively.
Figure 10F:
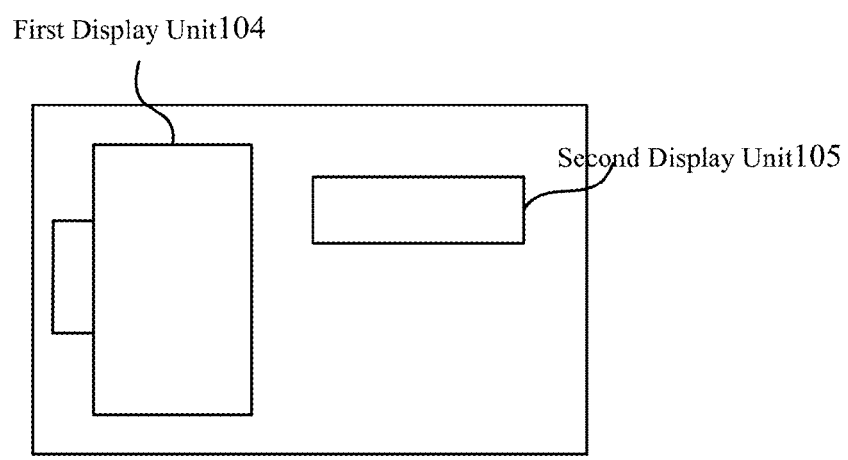

FIGS. 10E and 10F are the top and side views illustrating the third configuration example of the visible portion of the electronic apparatus in accordance with the embodiment of the disclosure, respectively.

The first and second visible portions 1041 and 1051 have the third configuration example of setting to be adjacent on the body device 101 or the holding device 102, as shown in FIG. 10E. Unlike the second configuration example as shown in FIGS. 10C and 10D, the display direction of one of the first visible portion 1041 and the second visible portion 1051 is in the outward direction of the annular or the approximated annular space, and the direction of the other of the first visible portion 1041 and the second visible portion 1051 is in the direction perpendicular to the outward direction of the annular or the approximated annular space, as shown in FIG. 10F.

Returning to FIGS. 9A to 9C, the configuration of the distance detection unit 106 is further depicted.

The distance detection unit 106 is utilized to detect the first distance between the object and the distance detection unit, and generate the first operation trigger signal according to the relative relationship between the first distance and a threshold distance. The processing unit 103 generates a first control signal according to the first operation trigger signal, and controls the electronic apparatus to perform the first control signal, wherein when the relative relationship indicates that the first distance is less than or equal to the threshold distance, the first control signal is used to cause the electronic apparatus to turn off the display of the second display unit and turn on the display of the first display unit under the control of the processing unit; or when the relative relationship indicates that the first distance is greater than the threshold distance, the first control signal is used to cause the electronic apparatus to turn off the display of the first display unit and turn on the display of the second display unit under the control of the processing unit.

That is, in the case where it is assumed that the near-to-eye display is in the dial portion of the smart watch, when the proximity sensor detects that the user moves to approach the dial portion of the smart watch, it is decided that the user desires to use the near-eye display, at this point, the near-eye display may be enabled, and the common display is turned off, in order to save the energy consumption. Conversely, when the proximity sensor detects that the user moves away from the dial portion of the smart watch, it is decided that the user desires to use the common display, at this point, the common display may be enabled, and the near-to-eye display is turned off, in order to save the energy consumption. That is, different display units may be switched to a work state by the smart watch according to the distance between the human body and the electronic apparatus detected by the proximity sensor.

To this end, the proximity sensor may simply emit a light outwardly and detect whether a returned light is able to be emitted by the user, and makes a decision about which the user has approached the near-to-eye display when the emitted light is capable of being detected, and generates a switch display trigger signal.

Alternatively, the proximity sensor may detect an absolute distance between the user and the near-to-eye display directly in other ways, compares the absolute distance with one preset threshold, and generates the switch display trigger signal when it is detected that the absolute distance is changed from a value less than the preset threshold to a value greater than the preset threshold or from a value greater than the preset threshold to a value less than the preset threshold.

Apparently, in order to complete the operation as described above, the distance detection unit and the first visible portion are set in the same region, for example, both of them may be set a first region where the first visible portion 1041 of the first display unit 104 is located.

The electronic apparatus in accordance with the embodiments of the disclosure is described with reference to FIGS. 1A to 9C hereinabove. An acquisition control method used by the electronic apparatus will be described with reference to FIG. 11.

Figure 11:
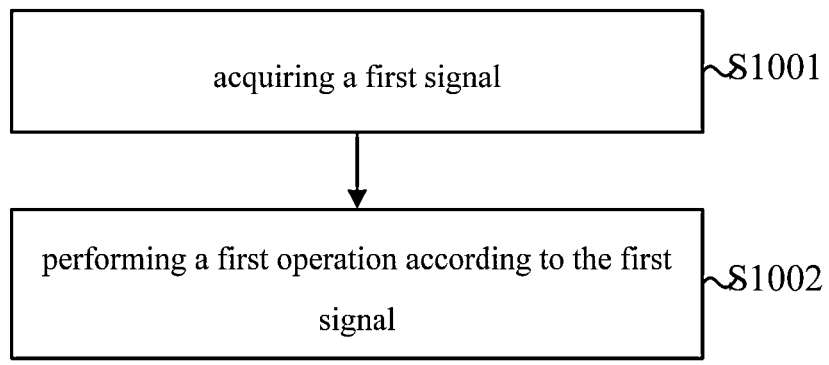
FIG. 11 is a flow chart illustrating an acquisition control method in accordance with the disclosure.

FIG. 11 is the flow chart illustrating the acquisition control method in accordance with the disclosure. The acquisition control method as shown in FIG. 1I is applied to the electronic apparatus as shown in FIG. 1. As described above, the electronic apparatus comprises a body device comprising a processing unit for generating an image to be displayed and performing a display control and an acquisition control; a holding device connected with the body device, comprising at least a holding state in which the holding device may be at least one part of one annular space or at least one part of an approximated annular space compliant with a first predetermined condition, the annular or the approximated annular space may enclose the periphery of a cylinder compliant with a second predetermined condition; a first display unit set on the body device or the holding device for outputting a first image; and an acquisition unit set on at least one of the body device and the holding device for acquiring a first signal, wherein the first display unit comprises a first display component and a first optical component, the first display component is used to display the first image; the first optical component is used to receive a light corresponding to the first image sent from the first display component, and performs a optical path conversion on the light corresponding to the first image, so as to form an enlarged virtual image corresponding to the first image.

The acquisition method comprises the steps of acquiring a first signal (step S1001); and performing a first operation according to the first signal (step S1002).

In step S1001, a first signal may be acquired by the acquisition unit 106 of the electronic apparatus 100, and the first signal may be a sense signal, an image signal, a video signal, a sound signal, a biometric signal, and a distance signal, etc. The process proceeds into step S802 thereafter.

In step S1002, the electronic apparatus 100 is controlled to perform a first operation by the processing unit 103 of the electronic apparatus 100 based on the first signal acquired in step S1001. Particularly, the first operation may be a storage, a display, a play, and/or a delivery of the first signal, and may also be a control operation performed on the electronic apparatus according to the first signal, and may also be an authentication operation made to the identity of the user according to the first signal, as described above.

The electronic apparatus and the acquisition control method in accordance with the embodiments of the disclosure are described with reference to FIGS. 1 to 11 hereinabove. The electronic apparatus and the acquisition control method in accordance with the embodiments of the disclosure utilize an enlarged virtual image display comprising the display component and the optical system to achieve an image or video display providing larger size and higher resolution without any limitation of the size of the wearable electronic apparatus itself, such as the smart watch, meanwhile, they utilize a signal acquisition operation comprising various acquisition units to achieve various operations and controls suitable for the wearable electronic apparatus, such that a best user experience is provided for a wide variety of different usages for the electronic apparatus. Furthermore, the electronic apparatus exhibits low energy consumption, and is not limited to the use conditions, providing good privacy for use at the same time, as compared with the micro projector for displaying larger image and video as well.

Those skilled in the art may understand clearly that the disclosure can be implemented by means of a software plus a necessary hardware platform or the software or the hardware by the description of the above implementations. On the basis of such appreciation, all or part of the contributions made by the solution of the disclosure to the related art can be embodied by a form of software product which may be stored in a storage medium, such as ROM/RAM, a magnetic disk, an optical disk, and so on, comprising several instructions for causing a computer apparatus, which can be a personal computer, a server, or a network apparatus, etc., to perform the methods recited in respective embodiments of the disclosure or some parts thereof.

Respective embodiments of the disclosure are described above. However, it is understood by those skilled in the art that various modifications, combinations, or sub-combinations may be made to those embodiments and those modifications should fall within the scope of the disclosure, without departing from the principle and spirit thereof.

The invention claimed is:

1. An electronic apparatus comprising
a body device comprising a processing unit for generating an image to be displayed and performing a display control and an acquisition control;
a holding device connected with the body device, comprising at least a holding state in which the holding device is able to be at least one part of one annular space or at least one part of an approximated annular space compliant with a first predetermined condition, the annular or the approximated annular space is able to enclose the periphery of a cylinder compliant with a second predetermined condition;
a first display unit set on the body device or the holding device for outputting a first image;
a second display unit at least set on the body device or the holding device for outputting a second image; and
an acquisition unit set on at least one of the body device and the holding device for acquiring a first signal,
wherein the first display unit comprises a first display component and a first optical component, the first display component is used for displaying the first image; the first optical component is used for receiving a light emitted from the first display component corresponding to the first image, and performs an optical path conversion on the light corresponding to the first image, so as to form an enlarged virtual image corresponding to the first image, and the processing unit is used to generate the second image,
wherein the first and second display units are the display units compliant with different display principles and the displays of the first and second display units are switched according a first distance between an eye of a user and the electronic apparatus, and when the first distance is less than a threshold distance, the first display unit is switched to display, and when the first distance is greater than the threshold distance, the second display unit is switched to display,
wherein the acquisition unit comprises a sensing unit for sensing a sense control operation generated when an operating object touches or near touches a sense region to generate a first sense signal,
the first display unit comprises a first visible portion which is a portion viewed by the user so as to see a displayed content thereof in the first display unit,
wherein the first visible portion is nested inside at least part of a strip region formed by the sense region or a direction of an outer normal line of the sense region and an image output direction of the first visible portion are opposite radially to each other in the annular or the approximated annular space,
wherein the acquisition unit comprises a distance detection unit for detecting the first distance between the eyes of the user and the distance detection unit, and generating a first operation trigger signal according to a relative relationship between the first distance and the threshold distance,
the processing unit generates a first control signal according to the first operation trigger signal, and controls the electronic apparatus to perform the first control signal,
wherein when the relative relationship indicates that the first distance is less than or equal to the threshold distance, the first control signal is used to cause the electronic apparatus to turn off the display of the second display unit and turn on the display of the first display unit under the control of the processing unit; or
when the relative relationship indicates that the first distance is greater than the threshold distance, the first control signal is used to cause the electronic apparatus to turn off the display of the first display unit and turn on the display of the second display unit under the control of the processing unit.

2. The electronic apparatus of claim 1, wherein the processing unit generates a first control signal according to the first sense signal, and controls the electronic apparatus to perform the first control signal.

3. The electronic apparatus of claim 1, wherein the acquisition unit comprises an image capture unit for capturing an image to generate a first image capture signal, wherein an action control operation generated by an operating object is captured by the image capture unit to generate the first image capture signal, and the processing unit generates a first control signal according to the first image capture signal and controls the electronic apparatus to perform the first control signal; or
wherein the acquisition unit comprises a sound capture unit for capturing a sound to generate a first sound capture signal, wherein a sound control operation made by a user is captured by the sound capture unit to generate the first sound capture signal, and the processing unit generates a first control signal according to the first sound capture signal and controls the electronic apparatus to perform the first control signal; or
wherein the acquisition unit comprises a biometric capture unit for obtaining a first biometric information of a user, and the electronic apparatus further comprises: an operation input unit set on at least one of the body device and the holding device, which is used to obtain an interactive control operation input by the user to generate a first operation input signal, and while the interactive operation control is obtained by the operation input unit, the first biometric information is obtained by the biometric capture unit, and the processing unit generates a first control signal according to the first operation input signal and controls the electronic apparatus to perform the first control signal.

4. The electronic apparatus of claim 1, wherein the acquisition unit comprises a biometric capture unit for obtaining a first biometric information of a user,
the electronic apparatus further comprises: an operation input unit set on at least one of the body device and the holding device for obtaining an interactive control operation input by a user to generate a first operation input signal, the first biometric information is obtained by the biometric capture unit while the interactive control operation is obtained by the operation input unit, and the processing unit generates a first control signal according to the first operation input signal, and controls the electronic apparatus to perform the first control signal, wherein the biometric capture unit is used as the operation input unit, and when the interactive control operation is captured by the biometric capture unit, a first biometric capture signal is generated by the biometric capture unit according to the interactive control operation, and the processing unit obtains the first biometric information according to the first biometric capture signal, generates a first control signal according to the first biometric capture signal, and controls the electronic apparatus to perform the first control signal.

5. The electronic apparatus of claim 2, wherein the is located on a first region, and the first region and the sense region are the adjacent regions with at least one common side there between.

6. The electronic apparatus of claim 5, wherein the first display unit and the sense unit are set concurrently on the body device or the holding device, and the first region and the sense region are on the same plane, and the sense region is set on at least part of a region enclosing the periphery of the first region, wherein the first visible portion and the sense region are on an external surface of the annular or the approximated annular space concurrently, and the display direction of the first visible portion is in an outward direction of the annular or the approximated annular space; or the first visible portion and the sense region are on a same lateral surface with a first angle with respect to the external surface of the annular or the approximated annular space concurrently, and the display direction of the first visible portion is in a direction with the first angle with respect to an outward direction of the annular or the approximated annular space.

7. The electronic apparatus of claim 5, wherein the first display unit and the sense unit are set concurrently on the body device or the holding device, and the first region and the sense region are on two planes with a first angle there between, wherein the first visible portion is on an external surface of the annular or the approximated annular space, and a display direction of the first visible portion is in an outward direction of the annular or the approximated annular space, as well as the sense region is on a lateral surface with a first angle with respect to the external surface of the annular or the approximated annular space; or the first visible portion is on a lateral surface with the first angle with respect to the external surface of the annular or the approximated annular space, and the display direction of the first visible portion is in a direction with the first angle with respect to an outward direction of the annular or the approximated annular space, as well as the sense region is on the external surface of the annular or the approximated annular space; or the first visible portion is on a first lateral surface with the first angle with respect to the external surface of the annular or the approximated annular space, and the display direction of the first visible portion is in a direction with the first angle with respect to an outward direction of the annular or the approximated annular space, as well as the sense region is on a second lateral surface with a second angle with respect to the external surface of the annular or the approximated annular space, and the second and first lateral surfaces are two lateral surfaces with a third angle there between.

8. The electronic apparatus of claim 2, wherein the first display unit comprises a first visible portion which is a portion viewed by a user so as to see a displayed content thereof in the first display unit and located on a first region, and the first region and the sense region are the non-adjacent regions without any common side there between.

9. The electronic apparatus of claim 8, wherein one of the first display unit and the sense unit is set on the body device, and the other is set on the holding device, wherein the first visible portion and the sense region are on the external surface of the annular or the approximated annular space concurrently, and a direction of an outer normal line of the sense region and an image output direction of the first visible portion are opposite radially to each other in the annular or the approximated annular space.

10. The electronic apparatus of claim 8, wherein the first display unit and the sense unit are set concurrently on the body device or the holding device, and the first region and the sense region are on two opposite planes, wherein the first visible portion is on an external surface of the annular or the approximated annular space, and a display direction of the first visible portion is in an outward direction of the annular or the approximated annular space, as well as the sense region is on an internal surface of the annular or the approximated annular space; or the first visible portion is on a first lateral surface with a first angle with respect to the external surface of the annular or the approximated annular space, and the display direction of the first visible portion is in a direction with the first angle with respect to an outward direction of the annular or the approximated annular space, as well as the sense region is on a second lateral surface with a second angle with respect to the external surface of the annular or the approximated annular space, and the second and first lateral surfaces are two opposite lateral surfaces.

11. The electronic apparatus of claim 3, wherein when the acquisition unit comprises an image capture unit, or when the acquisition unit comprises a biometric capture unit and the biometric capture unit comprises an image capture unit for capturing an action control operation made by an operating object to generate a first image capture signal and to obtain the first biometric information according to the first image capture signal, the first display unit and the image capture unit are set on the holding device or the body device concurrently, and the image capture direction of the image capture unit is the same as the image output direction of the first visible portion of the first display unit, the first visible portion is a portion viewed by a user to see the displayed content thereof in the first display unit.

12. The electronic apparatus of claim 11, wherein the first visible portion is on the surface of the annular or the approximated annular space, and the image capture unit is inside the annular or the approximated annular space, a transmittance rate of the first visible portion is compliant with a predetermined condition in a direction opposite to the display direction, enabling the image capture unit to capture the image through the first visible portion, or the first visible portion and the image capture unit are on the surface of the annular or the approximated annular space concurrently, and the image capture unit is set on at least part of the region around which the first visible portion is enclosed.

13. The electronic apparatus of claim 3, wherein when the acquisition unit comprises an image capture unit, or when the acquisition unit comprises a biometric capture unit and the biometric capture unit comprises an image capture unit for capturing an action control operation made by an operating object to generate a first image capture signal and to obtain the first biometric information according to the first image capture signal, an image capture direction of the image capture unit is different from an image output direction of the first visible portion of the first display unit, the first visible portion is a portion viewed by a user to see the displayed content thereof in the first display unit.

14. The electronic apparatus of claim 13, wherein the first display unit and the image capture unit are set concurrently on the holding device; or one of the first display unit and the image capture unit is set on the body device, and the other is set on the holding device,
wherein the image capture direction of the image capture unit and the image output direction of the first visible portion are opposite to each other radially in the annular or the approximated annular space; or
the image capture direction of the image capture unit and the image output direction of the first visible portion have a first angle there between radially in the annular or the approximated annular space.

15. The electronic apparatus of claim 13, wherein the first display unit and the image capture unit are set concurrently on the body device,
wherein the first visible portion is on a first lateral surface with a first angle with respect to the external surface of the annular or the approximated annular space, and the display direction of the first visible portion is in a direction with the first angle with respect to an outward direction of the annular or the approximated annular space, as well as the image capture unit is on a second lateral surface with a second angle with respect to the external surface of the annular or the approximated annular space, and the second and first lateral surfaces are two opposite lateral surfaces, the image capture direction of the image capture unit is opposite to the display direction of the first visible portion; or
the first visible portion is on the external surface of the annular or the approximated annular space, and the display direction of the first visible portion is in an outward direction of the annular or the approximated annular space, as well as the image capture unit is on the internal surface of annular or the approximated annular space, and the image capture direction of the image capture unit is opposite to the display direction of the first visible portion.

16. The electronic apparatus of claim 3, wherein when the acquisition unit comprises a sound capture unit, or the acquisition unit comprises a biometric capture unit and the biometric capture unit comprises a sound capture unit for capturing a sound control operation made by a user to generate a first sound capture signal and to obtain the first biometric information according to the first sound capture signal, the acquisition unit further comprises an image capture unit for capturing an image to generate a first image capture signal, and the sound capture unit and the image capture unit are set concurrently at the adjacent positions on the holding device or the body device.

17. The electronic apparatus of claim 3, wherein when the acquisition unit comprises a sound capture unit, or the acquisition unit comprises a biometric capture unit and the biometric capture unit comprises a sound capture unit for capturing a sound control operation made by a user to generate a first sound capture signal and to obtain the first biometric information according to the first sound capture signal, the sound capture unit is an array of sound capture units comprising a plurality of sound capture sub-units,
each of the sound capture sub-units in the array of sound capture units is set spaced on at least one of the body device or the holding device, and when a sound is made by the user, the sound is captured by each of the sound capture sub-units to generate the first sound capture signal, and
wherein intensities of the first sound capture signals generated by each of the sound capture sub-units are compared with each other by the processing unit, and sound capture sub-units other than the sound capture sub-units in which the first sound signals generated have maximum intensities are turned off.

18. The electronic apparatus of claim 1, wherein the acquisition unit comprises a distance detection unit for detecting a first distance between the object and the distance detection unit, and generating a first operation trigger signal according to a relative relationship between the first distance and a threshold distance, and the processing unit generates a first control signal according to the first operation trigger signal, and controls the electronic apparatus to perform the first control signal.

* * * * *